US011906928B2

(12) United States Patent
Anno et al.

(10) Patent No.: US 11,906,928 B2
(45) Date of Patent: Feb. 20, 2024

(54) ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

(71) Applicant: FUJIFILM Business Innovation Corp., Tokyo (JP)

(72) Inventors: Shintaro Anno, Minamiashigara (JP); Yoshimasa Fujihara, Minamiashigara (JP); Atsushi Sugawara, Minamiashigara (JP); Daisuke Noguchi, Minamiashigara (JP); Satoshi Miura, Minamiashigara (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 299 days.

(21) Appl. No.: 17/400,203

(22) Filed: Aug. 12, 2021

(65) Prior Publication Data

US 2022/0373915 A1 Nov. 24, 2022

(30) Foreign Application Priority Data

May 24, 2021 (JP) ................................ 2021-087063

(51) Int. Cl.
*G03G 9/097* (2006.01)
*G03G 9/08* (2006.01)
(Continued)

(52) U.S. Cl.
CPC ....... *G03G 9/09708* (2013.01); *G03G 9/0819* (2013.01); *G03G 9/08755* (2013.01);
(Continued)

(58) Field of Classification Search
CPC .......... G03G 9/08755; G03G 9/09708; G03G 9/09725
See application file for complete search history.

(56) References Cited

U.S. PATENT DOCUMENTS

2005/0026063 A1 2/2005 Komoto et al.
2010/0196817 A1* 8/2010 Sasaki .................... G03G 15/08 525/437

(Continued)

FOREIGN PATENT DOCUMENTS

EP 1 074 890 A1 2/2001
EP 2 860 584 A1 4/2015

(Continued)

OTHER PUBLICATIONS

Translation of JP 2014-130202.*

(Continued)

*Primary Examiner* — Peter L Vajda
(74) *Attorney, Agent, or Firm* — Oliff PLC

(57) ABSTRACT

An electrostatic charge image developing toner includes: a toner particle containing a binder resin; and an external additive containing alumina particles having a volume average particle diameter of more than 5 nm and 80 nm or less and silica particles having a volume average particle diameter of 10 nm or more and 90 nm or less, and in the toner particle, a Net intensity $N_A$ of a total of an alkali metal element and an alkaline earth metal element, measured by fluorescence X-ray analysis, is 0.10 kcps or more and 1.30 kcps or less, and a ratio (Ws/Wa) of a content Ws of the silica particles to a content Wa of the alumina particles is more than 0.5 and less than 35.

14 Claims, 2 Drawing Sheets

(51) Int. Cl.
*G03G 9/087* (2006.01)
*G03G 15/08* (2006.01)
*G03G 21/18* (2006.01)

(52) U.S. Cl.
CPC ......... *G03G 9/09725* (2013.01); *G03G 15/08* (2013.01); *G03G 21/1814* (2013.01)

(56) References Cited

U.S. PATENT DOCUMENTS

| | | | | |
|---|---|---|---|---|
| 2013/0252156 | A1 | 9/2013 | Kamiwaki et al. | |
| 2017/0329246 | A1 * | 11/2017 | Yamawaki ......... | G03G 9/08711 |
| 2019/0354031 | A1 | 11/2019 | Mori | |

FOREIGN PATENT DOCUMENTS

| | | | | | |
|---|---|---|---|---|---|
| JP | 2005-062807 | A | 3/2005 | | |
| JP | 2014-130202 | * | 7/2014 | ............... | G03G 9/08 |
| JP | 2018-095371 | A | 6/2018 | | |
| JP | 2018-112688 | * | 7/2018 | | |
| JP | 2018-165549 | A | 10/2018 | | |
| JP | 2019-200345 | A | 11/2019 | | |
| JP | 2020-038308 | A | 3/2020 | | |

OTHER PUBLICATIONS

Translation of JP 2018-112688.*
Feb. 14, 2022 extended Search Report issued in European Patent Application No. 21195252.8.

* cited by examiner

ELECTROSTATIC CHARGE IMAGE DEVELOPING TONER, ELECTROSTATIC CHARGE IMAGE DEVELOPER, TONER CARTRIDGE, PROCESS CARTRIDGE, AND IMAGE FORMING APPARATUS

CROSS-REFERENCE TO RELATED APPLICATIONS

This application is based on and claims priority under 35 USC 119 from Japanese Patent Application No. 2021-087063 filed on May 24, 2021.

BACKGROUND

Technical Field

The present invention relates to an electrostatic charge image developing toner, an electrostatic charge image developer, a toner cartridge, a process cartridge, and an image forming apparatus.

Related Art

JP-A-2005-062807 discloses "a toner including: a toner particle including at least a binder resin, a colorant, a releasing agent, and a sulfur-containing resin; and an inorganic fine powder mixed with the toner particle, in which (i) the toner particle contains at least one element selected from the group consisting of magnesium, calcium, barium, zinc, aluminum, and phosphorus and satisfies the relationship: $4 \leq T/S \leq 30$ (T (unit: ppm) represents a total content of the above elements, and S (unit: ppm) represents a content of sulfur element); (ii) a weight-average particle diameter (D4) of the toner is in a range of 3 μm to 10 μm; and (iii) an average circularity of the toner is within a range of 0.950 to 0.995".

JP-A-2019-200345 discloses "an electrostatic charge image developing toner including a toner particle including a toner base particle and an external additive disposed on a surface of the toner base particle, in which the toner base particle includes a crystalline resin as a binder resin, the external additive includes alumina particles, and a presence ratio of aluminum atoms on the surface of the toner particle is 0.8 atom % or more and 5.0 atom % or less".

JP-A-2020-038308 discloses "an electrostatic charge image developer including at least an electrostatic charge image developing toner including a toner particle including an external additive on a surface of a toner base particle, and a carrier particle, in which the external additive constituting the toner particle contains at least a complex oxide particle mainly containing alumina and silica; the complex oxide particle contains alumina within a range of 5 mass %/a to 50 mass % and silica within a range of 50 mass % to 95 mass %; a number average particle diameter of primary particles of the complex oxide particles is within a range of 7 nm to 80 nm; and a degree of hydrophobicity of the complex oxide particle is 40 or more".

SUMMARY

Aspects of non-limiting embodiments of the present disclosure relate to providing an electrostatic charge image developing toner including a toner particle containing a binder resin, and an external additive containing alumina particles having a volume average particle diameter of more than 5 nm and 80 nm or less and silica particles having a volume average particle diameter of 10 nm or more and 90 nm or less, the electrostatic charge image developing toner being capable of preventing image density unevenness in a case where an image having a high image density is formed after an images having a low image density is continuously formed under a high-temperature and high-humidity environment, as compared with a case where a Net intensity $N_A$ of a total of an alkali metal element and an alkaline earth metal element, measured by fluorescence X-ray analysis, is less than 0.10 kcps or exceeds 1.30 kcps, or a case where a ratio (Ws/Wa) of a content Ws of the silica particles to a content Wa of the alumina particles is equal to or less than 0.5, or equal to or more than 35.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an electrostatic charge image developing toner including: a toner particle containing a binder resin; and an external additive containing alumina particles having a volume average particle diameter of more than 5 nm and 80 nm or less and silica particles having a volume average particle diameter of 10 nm or more and 90 nm or less, in which in the toner particle, a Net intensity $N_A$ of a total of an alkali metal element and an alkaline earth metal element, measured by fluorescence X-ray analysis, is 0.10 kcps or more and 1.30 kcps or less, and a ratio (Ws/Wa) of a content Ws of the silica particles to a content Wa of the alumina particles is more than 0.5 and less than 35.

BRIEF DESCRIPTION OF THE DRAWINGS

Exemplary embodiment(s) of the present invention will be described in detail based on the following figures, wherein.

DETAILED DESCRIPTION

Figure 1:
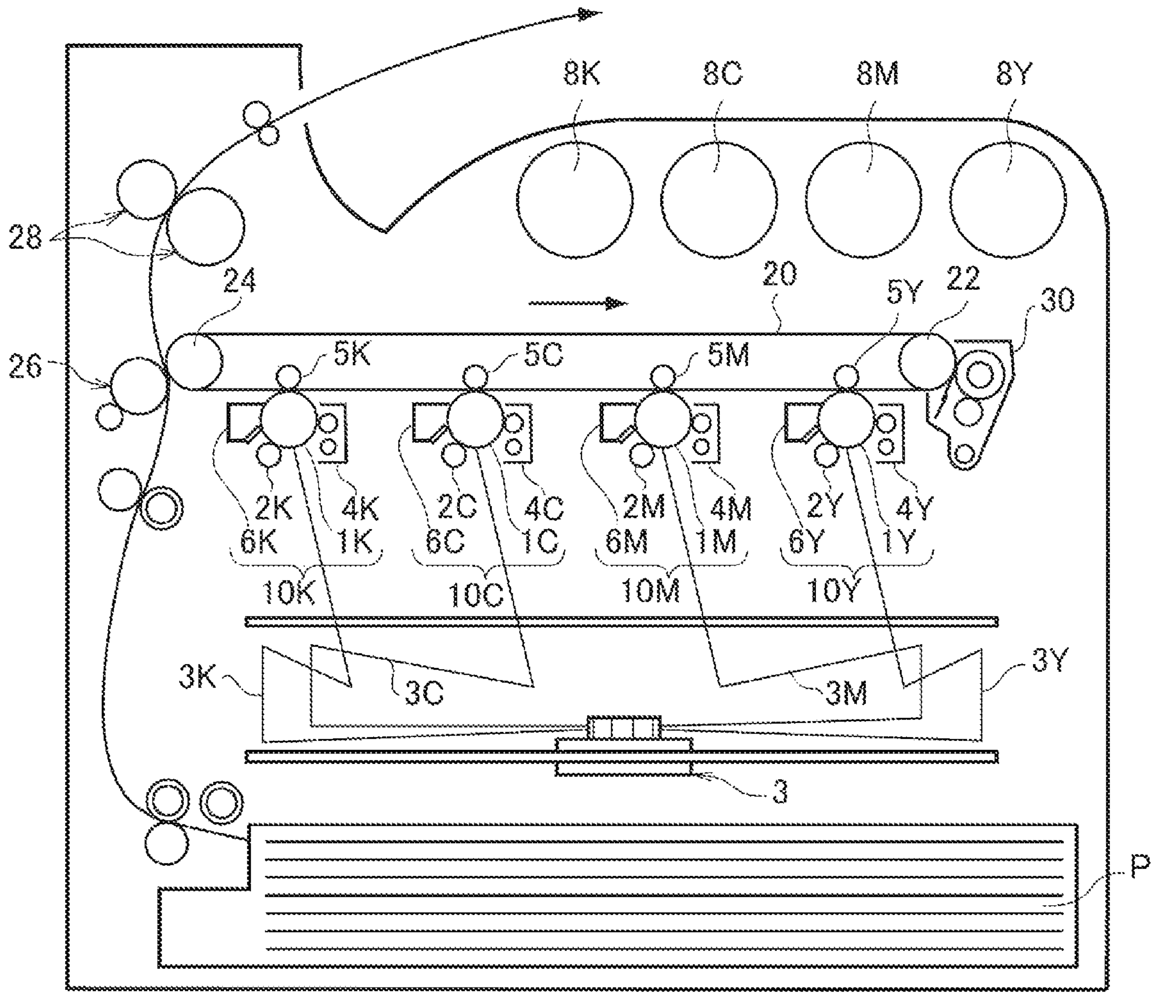
FIG. 1 is a schematic configuration diagram illustrating an example of an image forming apparatus according to the exemplary embodiment.

Hereinafter, an exemplary embodiment being an example of the present invention will be described in detail.

In numerical ranges described in stages, an upper limit or a lower limit described in a certain numerical range may be replaced with an upper limit or a lower limit of a numerical range described in other stages.

In the numerical ranges, the upper limit or the lower limit described in the certain numerical range may be replaced with values illustrated in Example(s).

Referring to the amount of each component in the composition, in a case where there are plural substances corresponding to each component in the composition, unless otherwise specified, it refers to the total amount of the plural substances present in the composition.

The term "step" indicates not only an independent step, and even when a step cannot be clearly distinguished from other steps, this step is included in the term "step" as long as the intended purpose of the step is achieved.

Each component may contain plural kinds of substances.

In a case of referring to the amount of each component in the composition, in a case where there are plural kinds of substances corresponding to each component in the composition, unless otherwise specified, it refers to the total amount of the plural kinds of substances present in the composition.

The term “alkali metal element” refers to Li, Na, K, Rb, Cs, and Fr.

The “alkaline earth metal element” refers to Be, Mg, Ca, Sr. Ba, and Ra.

<Electrostatic Charge Image Developing Toner>

An electrostatic charge image developing toner according to the exemplary embodiment (hereinafter, “electrostatic charge image developing toner” may also be simply referred to as “toner”) includes a toner particle containing a binder resin, and an external additive containing alumina particles having a volume average particle diameter of more than 5 nm and 80 nm or less and silica particles having a volume average particle diameter of 10 nm or more and 90 nm or less.

In addition, in the toner particle, a Net intensity $N_A$ of a total of an alkali metal element and an alkaline earth metal element, measured by fluorescence X-ray analysis, is 0.10 kcps or more and 1.30 kcps or less, and a ratio (Ws/Wa) of a content Ws of the silica particles to a content Wa of the alumina particles is more than 0.5 and less than 35.

With the above-described configuration, the toner according to the exemplary embodiment prevents image density unevenness when an image having a high image density is formed after an image having a low image density is continuously formed under a high-temperature and high-humidity environment. The reasons are presumed as follows.

From the viewpoint of improving environmental stability of toner charging, the alumina particles are used as the external additive. Since the alumina particles have an electrical resistance lower than that of other external additives, in a case where an image having a low image density is continuously formed under the high-temperature and high-humidity environment using the toner to which the alumina particles are externally added, the toner is likely to be excessively charged. Then, in a case where an image having a high image density is subsequently formed, the image density unevenness may be likely to occur.

It is presumed that the toner according to the exemplary embodiment may be achieved by the following mechanism. The toner includes the external additive containing the alumina particles having a volume average particle diameter of more than 5 nm and 80 nm or less and the silica particles having a volume average particle diameter of 10 nm or more and 90 nm or less. In the case where the volume average particle diameters of the alumina particles and the silica particles are within the above range, a difference in specific gravity is likely to occur between the alumina particles and the silica particles. Since the alumina particles have a specific gravity higher than that of the silica particles, the alumina particles are likely to adhere to the surface of the toner particle, and the silica particles are likely to adhere to the alumina particles. That is, it is easy to form a two-layer structure of the external additive on the surface of the toner particle, the two-layer structure including a layer made of the alumina particles and a layer made of the silica particles formed on the layer made of the alumina particles.

In a case where the ratio (Ws/Wa) of the content Ws of the silica particles to the content Wa of the alumina particles is more than 0.5 and less than 35, deviation in contents of the alumina particles and the silica particles is prevented, and thus the two-layer structure of the external additive is more easily formed. In addition, in the toner particle, the Net intensity $N_A$ of the total of the alkali metal element and the alkaline earth metal element, measured by the fluorescence X-ray analysis, is 0.10 kcps or more and 1.30 kcps or less. In the case where the Net intensity $N_A$ in the toner particle is within the above range, adsorbed moisture easily adheres to the alkali metal element and the alkaline earth metal element present on a toner particle surface side. That is, since the toner particle surface contains a large amount of the adsorbed moisture, the external additive is more likely to adhere to the surface of the toner particle, and the two-layer structure of the external additive is more likely to be maintained.

As described above, the toner according to the exemplary embodiment has a structure including a large amount of the silica particles on the outermost surface. Since the silica particles have a relatively high electrical resistance, the toner is less likely to be excessively charged even when an image having a low image density is continuously formed under the high-temperature and high-humidity environment.

Therefore, it is presumed that the toner according to the exemplary embodiment prevents the image density unevenness when an image having a high image density is formed after an image having a low image density is continuously formed under the high-temperature and high-humidity environment.

(Toner Particle)

The toner particle contains the binder resin. The toner particle may contain a colorant, a releasing agent, an alkali metal element supply source, an alkaline earth metal element supply source, an S element supply source, and other additives.

—Binder Resin—

Examples of the binder resin include vinyl resins composed of homopolymers of monomers such as styrenes (such as styrene, parachlorostyrene, and α-methylstyrene), (meth) acrylic acid esters (such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate), ethylenically unsaturated nitriles (such as acrylonitrile and methacrylonitrile), vinyl ethers (such as vinyl methyl ether and vinyl isobutyl ether), vinyl ketones (such as vinyl methyl ketone, vinyl ethyl ketone, and vinyl isopropenyl ketone), or olefins (such as ethylene, propylene, and butadiene), or copolymers obtained by combining two or more of these monomers.

Examples of the binder resin include a non-vinyl resin such as an epoxy resin, a polyester resin, a polyurethane resin, a polyamide resin, a cellulose resin, a polyether resin, and a modified rosin, a mixture of the non-vinyl resin and the vinyl resin, and a graft polymer obtained by polymerizing a vinyl monomer in the presence of these.

These binder resins may be used alone or in combination of two or more thereof.

Examples of the binder resin include an amorphous (also referred to as “non-crystalline”) resin and a crystalline resin.

The “crystalline” of a resin refers to one having a clear endothermic peak in differential scanning calorimetry (DSC), not a stepwise change in endothermic amount, and specifically refers to one having a half-value width of the endothermic peak when measured at a temperature rising rate of 10 (° C./min) being within 15° C.

On the other hand, the “amorphous” of a resin refers to one having the half-value width of larger than 15° C., one showing a stepwise change in endothermic amount, or one having no clear endothermic peak observed.

The amorphous resin will be described.

Examples of the amorphous resin include common amorphous resins such as an amorphous polyester resin, an amorphous vinyl resin (such as a styrene acrylic resin), an epoxy resin, a polycarbonate resin, and a polyurethane resin. From the viewpoint that dispersibility of the alkali metal element and the alkaline earth metal element is improved in the toner particle and the metal elements are more likely to be present on a toner surface side, among the above amorphous resins, the amorphous polyester resin and the amorphous vinyl resin (particularly, a styrene acrylic resin) are preferred, and the amorphous polyester resin is more preferred.

It is also preferable to use an amorphous polyester resin and a styrene acrylic resin in combination as the amorphous resin.

It is also preferable to use an amorphous resin having an amorphous polyester resin segment and a styrene acrylic resin segment (hereinafter, also referred to as a "hybrid amorphous resin") as the amorphous resin.

Examples of the amorphous polyester resin include a polycondensate of a polycarboxylic acid and a polyhydric alcohol. As the amorphous polyester resin, a commercially available product or a synthesized product may be used.

Examples of the polycarboxylic acid include aliphatic dicarboxylic acids (such as oxalic acid, malonic acid, maleic acid, fumaric acid, citraconic acid, itaconic acid, glutaconic acid, succinic acid, alkenylsuccinic acid, adipic acid, and sebacic acid), alicyclic dicarboxylic acids (such as cyclohexanedicarboxylic acid), aromatic dicarboxylic acids (such as terephthalic acid, isophthalic acid, phthalic acid, and naphthalenedicarboxylic acid), and an anhydride thereof or a lower alkyl ester (such as having 1 to 5 carbon atoms) thereof. Among these, the polycarboxylic acid is preferably, for example, an aromatic dicarboxylic acid.

As the polycarboxylic acid, a tricarboxylic acid or higher carboxylic acid having a cross-linked structure or a branched structure may be used in combination with a dicarboxylic acid. Examples of the tricarboxylic acid or higher carboxylic acid include trimellitic acid, pyromellitic acid, and an anhydride thereof or a lower alkyl ester (such as having 1 to 5 carbon atoms) thereof.

The polycarboxylic acid may be used alone or in combination of two or more thereof.

Examples of the polyhydric alcohol include aliphatic diols (such as ethylene glycol, diethylene glycol, triethylene glycol, propylene glycol, butanediol, hexanediol, and neopentyl glycol), alicyclic diols (such as cyclohexanediol, cyclohexanedimethanol, and hydrogenated bisphenol A), and aromatic diols (such as an ethylene oxide adduct of bisphenol A and a propylene oxide adduct of bisphenol A). Among these, the polyhydric alcohol is preferably, for example, an aromatic diol and an alicyclic diol, and more preferably an aromatic diol.

As the polyhydric alcohol, a trihydric alcohol or higher polyhydric alcohol having a cross-linked structure or a branched structure may be used in combination with a diol. Examples of the trihydric alcohol or higher polyhydric alcohol include glycerin, trimethylolpropane, and pentaerythritol.

The polyhydric alcohol may be used alone or in combination of two or more thereof.

The amorphous polyester resin is obtained by a common production method. Specifically, for example, the amorphous polyester resin may be obtained by a method in which a polymerization temperature is set to 180° C. or higher and 230° C. or lower, a pressure in a reaction system is reduced as necessary, and a reaction is performed while removing water and alcohol generated during the condensation.

In a case where raw material monomers are insoluble or incompatible at a reaction temperature, a high boiling point solvent may be added as a dissolution assisting agent for dissolution. In this case, a polycondensation reaction is performed while distilling off the dissolution assisting agent. In a case where there is a poorly compatible monomer, the poorly compatible monomer may be firstly condensed with an acid or alcohol to be polycondensed with the poorly compatible monomer and then the obtained product is polycondensed with the main component.

Here, examples of the amorphous polyester resin include a modified amorphous polyester resin in addition to the unmodified amorphous polyester resin described above. The modified amorphous polyester resin is an amorphous polyester resin in which a bonding group other than an ester bond is present, or an amorphous polyester resin in which a resin component different from the amorphous polyester resin component is bonded by a covalent bond, an ionic bond, or the like. Examples of the modified amorphous polyester resin include a resin in which an amorphous polyester resin having a functional group such as an isocyanate group that reacts with an acid group or a hydroxyl group at a terminal thereof is reacted with an active hydrogen compound to modify the terminal.

The styrene acrylic resin is a copolymer obtained by copolymerizing at least a styrene-based monomer (a monomer having a styrene skeleton) and a (meth)acrylic monomer (a monomer having a (meth)acrylic group, preferably a monomer having a (meth)acryloxy group). Examples of the styrene acrylic resin include, for example, a copolymer of a styrene monomer and a (meth)acrylic acid ester monomer.

An acrylic resin portion in the styrene acrylic resin has a partial structure formed by polymerizing one or both of the acryl-based monomer and a methacryl-based monomer. The term "(meth)acryl" is an expression including both "acryl" and "methacryl".

Specific examples of the styrene-based monomer include styrene, alkyl-substituted styrenes (such as α-methylstyrene, 2-methylstyrene, 3-methylstyrene, 4-methylstyrene, 2-ethylstyrene, 3-ethylstyrene, and 4-ethylstyrene), halogen-substituted styrenes (such as 2-chlorostyrene, 3-chlorostyrene, and 4-chlorostyrene), and vinylnaphthalene. The styrene-based monomer may be used alone or in combination of two or more thereof.

Among these, the styrene-based monomer is preferably a styrene in terms of ease of reaction, ease of reaction control, and availability.

Specific examples of the (meth)acryl-based monomer include (meth)acrylic acid and (meth)acrylic acid ester. Examples of the (meth)acrylic acid ester include alkyl (meth)acrylate (such as methyl (meth)acrylate, ethyl (meth)acrylate, n-propyl (meth)acrylate, n-butyl (meth)acrylate, n-pentyl (meth)acrylate, n-hexyl (meth)acrylate, n-heptyl (meth)acrylate, n-octyl (meth)acrylate, n-decyl (meth)acrylate, n-dodecyl (meth)acrylate, n-lauryl (meth)acrylate, n-tetradecyl (meth)acrylate, n-hexadecyl (meth)acrylate, n-octadecyl (meth)acrylate, isopropyl (meth)acrylate, isobutyl (meth)acrylate, t-butyl (meth)acrylate, isopentyl (meth)acrylate, amyl (meth)acrylate, neopentyl (meth)acrylate, isohexyl (meth)acrylate, isoheptyl (meth)acrylate, isooctyl (meth)acrylate, 2-ethylhexyl (meth)acrylate, cyclohexyl (meth)acrylate, and t-butylcyclohexyl (meth)acrylate), aryl (meth)acrylate (such as phenyl (meth)acrylate, biphenyl (meth)acrylate, diphenylethyl (meth)acrylate, t-butylphenyl (meth)acrylate, and terphenyl (meth)acrylate), dimethylaminoethyl (meth)acrylate, diethylaminoethyl (meth)acrylate, methoxyethyl (meth)acrylate, 2-hydroxyethyl (meth)acrylate, β-carboxyethyl (meth)acrylate, and (meth)acrylamide. The (meth)acryl-based monomers may be used alone or in combination of two or more thereof.

Among these (meth)acrylic acid esters as the (meth)acryl-based monomers, (meth)acrylic acid esters having an alkyl group having 2 to 14 carbon atoms (preferably 2 to carbon atoms, and more preferably 3 to 8 carbon atoms) are preferable from the viewpoint of fixing property.

Among these, n-butyl (meth)acrylate is preferable, and n-butyl acrylate is more preferable.

A copolymerization ratio of the styrene-based monomer to the (meth)acryl-based monomer (based on mass, styrene-based monomer/(meth)acryl-based monomer) is not particularly limited, and may be 85/15 to 70/30.

The styrene acrylic resin may have a cross-linked structure. As the styrene acrylic resin having a cross-linked structure, for example, a styrene acrylic resin obtained by polymerizing at least a styrene-based monomer, a (meth) acryl-based monomer, and a cross-linkable monomer may be used.

Examples of the cross-linkable monomer include two or more functional crosslinking agents.

Examples of the bifunctional crosslinking agent include divinylbenzene, divinylnaphthalene, di(meth)acrylate compounds (such as diethylene glycol di(meth)acrylate, methylenebis (meth)acrylamide, decanediol diacrylate, and glycidyl (meth)acrylate), polyester-based di(meth)acrylate, and 2-([1'-methylpropylideneamino] carboxyamino) ethyl methacrylate.

Examples of the polyfunctional crosslinking agent include tri(meth)acrylate compounds (such as pentaerythritol tri(meth)acrylate, trimethylol ethane tri(meth)acrylate, and trimethylolpropane tri(meth)acrylate), tetra(meth)acrylate compounds (such as pentaerythritol tetra(meth)acrylate and oligoester (meth)acrylate), 2,2-bis (4-methacryloxy, polyethoxy phenyl) propane, diallyl phthalate, triallyl cyanurate, triallyl isocyanurate, triallyl trimellitate, and diaryl chlorendate.

From the viewpoint of preventing occurrence of decrease in image density and preventing the occurrence of the image density unevenness, and the fixing property, among these, as the cross-linkable monomer, a bifunctional or polyfunctional (meth)acrylate compound is preferable, a bifunctional (meth)acrylate compound is more preferable, a bifunctional (meth)acrylate compound having an alkylene group having 6 to 20 carbon atoms is still more preferable, and a bifunctional (meth)acrylate compound having a linear alkylene group having 6 to 20 carbon atoms is further preferable.

A copolymerization ratio (based on mass, crosslinkable monomer/total monomer) of the cross-linkable monomer to the total monomers is not particularly limited, and may be from 2/1,000 to 20/1,000.

A method for producing the styrene acrylic resin is not particularly limited, and various polymerization methods (such as solution polymerization, precipitation polymerization, suspension polymerization, bulk polymerization, emulsion polymerization, and the like) are applied. As a polymerization reaction, a common operation (such as a batch type, a semi-continuous type, a continuous type, or the like) is applied.

Hybrid Amorphous Resin

The hybrid amorphous resin is an amorphous resin in which the amorphous polyester resin segment and the styrene acrylic resin segment are chemically bonded.

Examples of the hybrid amorphous resin include a resin having a main chain made of a polyester resin and a side chain made of a styrene acrylic resin chemically bonded to the main chain; a resin having a main chain made of a styrene acrylic resin and a side chain made of a polyester resin chemically bonded to the main chain; a resin having a main chain formed by chemical bonding of a polyester resin and a styrene acrylic resin; and a resin having a main chain formed by chemical bonding of a polyester resin and a styrene acrylic resin, and at least one side chain of a side chain made of a polyester resin chemically bonded to the main chain and a side chain made of a styrene acrylic resin chemically bonded to the main chain.

The amorphous polyester resin and the styrene acrylic resin of each segment are as described above, and the description thereof is omitted.

A total amount of the polyester resin segment and the styrene acrylic resin segment in the entire hybrid amorphous resin may be 80 mass % or more, and is preferably 90 mass % or more, more preferably 95 mass % or more, and still more preferably 100 mass %.

In the hybrid amorphous resin, a proportion of the styrene acrylic resin segment in the total amount of the polyester resin segment and the styrene acrylic resin segment may be mass % or more and 60 mass % or less, and is preferably 25 mass % or more and 55 mass % or less, and more preferably 30 mass % or more and 50 mass % or less.

The hybrid amorphous resin may be produced by any of the following methods (i) to (iii).

(i) After the polyester resin segment is produced by condensation polymerization of the polyhydric alcohol and the polycarboxylic acid, addition polymerization is performed with the monomer constituting the styrene acrylic resin segment.

(ii) After the styrene acrylic resin segment is produced by addition polymerization with an addition polymerizable monomer, the polyhydric alcohol and the polycarboxylic acid are subjected to the condensation polymerization.

(iii) The condensation polymerization of the polyhydric alcohol and the polycarboxylic acid and the addition polymerization with the addition polymerizable monomer are performed in parallel.

A proportion of the hybrid amorphous resin to the total binder resin may be 60 mass % or more and 98 mass % or less, and is preferably 65 mass % or more and 95 mass % or less, and more preferably 70 mass % or more and 90 mass % or less.

A glass transition temperature (Tg) of the amorphous resin may be 50° C. or higher and 80° C. or lower, and is preferably 50° C. or higher and 65° C. or lower.

The glass transition temperature is determined from a DSC curve obtained by differential scanning calorimetry (DSC), and is more specifically determined by the "extrapolated glass transition onset temperature" described in a method for obtaining the glass transition temperature in "Method for measuring glass transition temperature of plastics" in JIS K 7121-1987.

A weight average molecular weight (Mw) of the amorphous resin may be 5,000 or more and 1,000,000 or less, and is preferably 7,000 or more and 500,000 or less.

A number average molecular weight (Mn) of the amorphous resin may be 2,000 or more and 100,000 or less.

A molecular weight distribution Mw/Mn of the amorphous resin may be 1.5 or more and 100 or less, and is preferably 2 or more and 60 or less.

The weight average molecular weight and the number average molecular weight are measured by gel permeation chromatography (GPC). The molecular weight is measured by GPC using a GPC-HLC-8120GPC manufactured by Tosoh Corporation as a measurement device, a column TSKgel Super HM-M (15 cm) manufactured by Tosoh Corporation, and a THF solvent. The weight average molecular weight and the number average molecular weight are calculated based on the measurement result using a molecular weight calibration curve prepared using a monodispersed polystyrene standard sample.

The crystalline resin will be described.

Examples of the crystalline resin include common crystalline resins such as crystalline polyester resins and crystalline vinyl resins (such as polyalkylene resins and long-chain alkyl (meth)acrylate resins). From the viewpoint that the dispersibility of the alkali metal element and the alkaline earth metal element is improved in the toner particle and the metal elements are more likely to be present on the toner surface side, among the above crystalline resins, the crystalline polyester resin is preferred.

Examples of the crystalline polyester resin include a polycondensate of a polycarboxylic acid and a polyhydric alcohol. As the crystalline polyester resin, a commercially available product or a synthesized product may be used.

Here, in order to easily form a crystal structure, the crystalline polyester resin may be a polycondensate prepared using a polymerizable monomer having a linear aliphatic group rather than a polymerizable monomer having aromatic group.

Examples of the polycarboxylic acid include aliphatic dicarboxylic acids (such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (such as dibasic acids such as phthalic acid, isophthalic acid, terephthalic acid, and naphthalene-2,6-dicarboxylic acid), and an anhydride thereof or a lower alkyl ester (such as having 1 to 5 carbon atoms) thereof.

As the polycarboxylic acid, a tricarboxylic acid or higher carboxylic acid having a cross-linked structure or a branched structure may be used in combination with a dicarboxylic acid. Examples of the tricarboxylic acid include aromatic carboxylic acids (such as 1,2,3-benzenetricarboxylic acid, 1,2,4-benzenetricarboxylic acid, and 1,2,4-naphthalenetricarboxylic acid), and an anhydride thereof or a lower alkyl ester (such as having 1 to 5 carbon atoms) thereof.

As the polycarboxylic acid, a dicarboxylic acid having a sulfonic acid group or a dicarboxylic acid having an ethylenic double bond may be used in combination with the dicarboxylic acids.

The polycarboxylic acid may be used alone or in combination of two or more thereof.

Examples of the polyhydric alcohol include aliphatic diols (such as a linear aliphatic diol having 7 to 20 carbon atoms in the main chain portion). Examples of the aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,20-eicosanediol. Among these, the aliphatic diol is preferably 1,8-octanediol, 1,9-nonanediol, and 1,10-decanediol.

As the polyhydric alcohol, a trihydric alcohol or higher alcohol having a cross-linked structure or a branched structure may be used in combination with a diol. Examples of the trihydric alcohol or higher polyhydric alcohol include glycerin, trimethylolethane, trimethylolpropane, and pentaerythritol.

The polyhydric alcohol may be used alone or in combination of two or more thereof.

Here, the polyhydric alcohol may have an aliphatic diol content of 80 mol % or more, and preferably 90 mol % or more.

The crystalline polyester resin may be obtained by, for example, a common production method as in the amorphous polyester resin.

A melting temperature of the crystalline resin may be 50° C. or higher and 100° C. or lower, and is preferably 55° C. or higher and 90° C. or lower, and more preferably 60° C. or higher and 85° C. or lower.

The melting temperature is determined from the DSC curve obtained by differential scanning calorimetry (DSC) according to the "melting peak temperature" described in a method for obtaining the melting temperature in "Method for measuring transition temperature of plastics" in JIS K 7121-1987.

A weight average molecular weight (Mw) of the crystalline resin may be 6,000 or more and 35,000 or less.

From the viewpoint that by interaction between a carboxyl group derived from the crystalline polyester resin and the alkali metal element and alkaline earth metal element in the toner particle, the dispersibility of the metal elements is further improved, so that the metal elements are more likely to be present on the toner surface side, the crystalline polyester resin may be a polymer of an α,ω-linear aliphatic dicarboxylic acid and an α,ω-linear aliphatic diol.

The α,ω-linear aliphatic dicarboxylic acid may be α,ω-linear aliphatic dicarboxylic acid in which an alkylene group connecting two carboxyl groups has 3 to 14 carbon atoms, preferably 4 to 12 carbon atoms, and more preferably 6 to 10 carbon atoms.

Examples of the α,ω-linear aliphatic dicarboxylic acid include succinic acid, glutaric acid, adipic acid, 1,6-hexane dicarboxylic acid (commonly used name: suberic acid), 1,7-heptane dicarboxylic acid (commonly used name: azelaic acid), 1,8-octane dicarboxylic acid (commonly used name: sebacic acid), 1,9-nonane dicarboxylic acid, 1,10-decane dicarboxylic acid, 1,12-dodecane dicarboxylic acid, 1,14-tetradecane dicarboxylic acid, and 1,18-octadecane dicarboxylic acid. Among these, 1,6-hexane dicarboxylic acid, 1,7-heptane dicarboxylic acid, 1,8-octane dicarboxylic acid, 1,9-nonane dicarboxylic acid, and 1,10-decane dicarboxylic acid are preferable.

The α,ω-linear aliphatic dicarboxylic acid may be used alone or in combination of two or more thereof.

The α,ω-linear aliphatic diol may be an α,ω-linear aliphatic diol in which an alkylene group connecting two hydroxy groups has 3 to 14 carbon atoms, preferably 4 to 12 carbon atoms, and more preferably 6 to 10 carbon atoms.

Examples of the α,ω-linear aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Among these, 1,6-hexanediol, 1,7-heptanediol, 1,8-octanediol, 1,9-nonanediol, and 1,10-decanediol are preferable.

The α,ω-linear aliphatic diol may be used alone or in combination of two or more thereof.

From the viewpoint that the dispersibility of the alkali metal element and the alkaline earth metal element in the toner particle is improved and the metal elements are more likely to be present on the toner surface side, the polymer of an α,ω-linear aliphatic dicarboxylic acid and an α,ω-linear aliphatic diol may be a polymer of at least one selected from the group consisting of 1,6-hexane dicarboxylic acid, 1,7-heptane dicarboxylic acid, 1,8-octane dicarboxylic acid, 1,9-nonane dicarboxylic acid, and 1,10-decane dicarboxylic acid and at least one selected from the group consisting of 1,6-hexanediol, 1,7-heptanediol, 1,8-octanediol, 1,9-nonanediol, and 1,10-decanediol. Among these, the polymer of an α,ω-linear aliphatic dicarboxylic acid and an α,ω-linear aliphatic diol is preferably a polymer of 1,10-decane dicarboxylic acid and 1,6-hexanediol.

From the viewpoint that by interaction between the binder resin and the alkali metal element and alkaline earth metal element in the toner particle, the dispersibility of the metal elements is further improved, so that the metal elements are more likely to be present on the toner surface side, the binder resin may contain an amorphous polyester resin and a crystalline polyester resin.

—Colorant—

Examples of the colorant include: pigments such as carbon black, Chrome Yellow, Hansa Yellow, Benzidine Yellow, Thlene Yellow, Quinoline Yellow, Pigment Yellow, Permanent Orange GTR, Pyrazolone Orange, Vulkan Orange, Watchung Red, Permanent Red, Brilliant Carmine 3B, Brilliant Carmine 6B, DuPont Oil Red, Pyrazolone Red, Lithol Red, Rhodamine B Lake, Lake Red C, Pigment Red, Rose Bengal, Aniline Blue, Ultramarine Blue, Calco oil Blue, Methylene Blue Chloride, Phthalocyanine Blue, Pigment Blue, Phthalocyanine Green, and Malachite Green Oxalate; and acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorants may be used alone or in combination of two or more thereof.

As the colorant, a surface-treated colorant may be used as necessary, or the colorant may be used in combination with a dispersant. In addition, plural kinds of colorants may be used in combination.

A content of the colorant may be 1 mass % or more and 30 mass % or less, and is preferably 3 mass % or more and 15 mass % or less, relative to the total amount of the toner particle.

—Releasing Agent—

Examples of the releasing agent include: hydrocarbon wax; natural wax such as carnauba wax, rice wax, and candelilla wax; synthetic wax or mineral or petroleum wax such as montan wax; and ester wax such as fatty acid ester and montanic acid ester. The releasing agent is not limited thereto.

The melting temperature of the releasing agent may be 50° C. or higher and 110° C. or lower, and is preferably 60° C. or higher and 100° C. or lower.

The melting temperature is obtained from the DSC curve obtained by differential scanning calorimetry (DSC) according to the "melting peak temperature" described in the method for obtaining the melting temperature in "Method for measuring transition temperature of plastics" in JIS K 7121-1987.

A content of the releasing agent may be, for example, 1 mass % or more and 20 mass % or less, and is preferably 5 mass % or more and 15 mass % or less, relative to the total amount of the toner particle.

—Alkali Metal Element Supply Source—

From the viewpoint of controlling the Net intensity $N_A$ to 0.10 kcps or more and 1.20 kcps or less, the toner particle may include the alkali metal element supply source.

Examples of the alkali metal element supply source include an additive containing an alkali metal element (such as a surfactant and an aggregating agent). Specific examples of the additive containing an alkali metal element include a salt containing an alkali metal element.

Examples of the salt containing an alkali metal element include: a salt containing a lithium element, such as lithium chloride, lithium sulfate, and lithium nitrate; a salt containing a sodium element, such as sodium chloride, sodium sulfate, and sodium nitrate; a salt containing a potassium element, such as potassium chloride, potassium sulfate, and potassium nitrate; a salt containing a rubidium element, such as rubidium chloride, rubidium sulfate, and rubidium nitrate; a salt containing a cesium element, such as cesium chloride, cesium sulfate, and cesium nitrate: and a salt containing a francium element, such as francium chloride, francium sulfate, and francium nitrate.

Examples of the salt containing an alkali metal element also include a salt containing an alkali metal sulfonate element (e.g. sodium alkylbenzene sulfonate such as sodium dodecylbenzene sulfonate).

—Alkaline Earth Metal Element Supply Source—

Examples of the alkaline earth metal element supply source include an additive containing an alkaline earth metal element (such as a surfactant and an aggregating agent). Specific examples of the additive containing an alkaline earth metal element include a salt containing an alkaline earth metal element.

Specific examples of the salt containing an alkaline earth metal element include: a salt containing a beryllium element such as beryllium chloride, beryllium sulfate, and beryllium nitrate; a salt containing a magnesium element such as magnesium chloride, magnesium sulfate, and magnesium nitrate; a salt containing a calcium element such as calcium chloride, calcium sulfate, and calcium nitrate; a salt containing a strontium element such as strontium chloride, strontium sulfate, and strontium nitrate; a salt containing a barium element such as barium chloride, barium sulfate, and barium nitrate; and a salt containing a radium element such as radium chloride, radium sulfate, and radium nitrate.

Examples of the salt containing an alkaline earth metal element include a salt containing an alkaline earth metal sulfonate element (e.g. calcium alkylbenzene sulfonate such as calcium dodecylbenzene sulfonate) and a metal sulfide salt (such as calcium polysulfide).

The salt containing an alkali metal element may be a salt containing a sodium element such as sodium chloride, sodium sulfate, or sodium nitrate.

The salt containing an alkaline earth metal element is preferably a salt containing a magnesium element such as magnesium chloride, magnesium sulfate, or magnesium nitrate, or a salt containing a calcium element such as calcium chloride, calcium sulfate, or calcium nitrate, and more preferably a salt containing a magnesium element such as magnesium chloride, magnesium sulfate, or magnesium nitrate.

A total content of the alkali metal element supply source and the alkaline earth metal element supply source in the toner particle may be added such that the Net intensity $N_A$ is 0.10 kcps or more and 1.20 kcps or less.

—S Element Supply Source—

Examples of a S element supply source include sulfur-containing additives (such as a surfactant, an aggregating agent, a chain transfer agent, and an initiator). Specific examples of a sulfur supply source include a metal sulfate, a metal sulfonate, and a metal sulfide.

Examples of the metal sulfate include alkali metal sulfate (such as lithium sulfate, sodium sulfate, potassium sulfate, rubidium sulfate, cesium sulfate, and francium sulfate), alkaline earth metal sulfate (such as beryllium sulfate, magnesium sulfate, calcium sulfate, strontium sulfate, barium sulfate, and radium sulfate), aluminum sulfate, and polyiron (II) sulfate.

Examples of the metal sulfonate include metal alkylbenzene sulfonate (such as sodium dodecylbenzene sulfonate, and calcium dodecylbenzene sulfonate).

Examples of the sulfide include calcium polysulfide.

A content of the S element supply source in the toner particle may be added such that the Net intensity $N_S$ is 3.0 kcps or more and 6.0 kcps or less.

—Other Additives—

Examples of other additives include common additives such as magnetic bodies, electrostatic charge control agents, and inorganic powders. These additives are contained in the toner particle as internal additives.

—Net Intensity—

The net intensity $N_A$ of the total of the alkali metal element and the alkaline earth metal element in the toner particle, measured by the fluorescence X-ray analysis, is 0.10 kcps or more and 1.30 kcps or less, and preferably 0.2 kcps or more and 1.00 kcps or less.

From the viewpoint that the external additive is more likely to adhere to the toner surface, and the two-layer structure of the external additive is more likely to be maintained, the Net intensity $N_A$ is preferably 0.20 kcps or more and 1.00 kcps or less, and more preferably 0.20 kcps or more and 0.50 kcps or less.

The Net intensity $N_A$ of the alkali metal element and the alkaline earth metal element is determined by measuring the Net intensity of the alkali metal element and the Net intensity of the alkaline earth metal element based on the following method and summing the measured values.

A method of measuring the Net intensity of the alkali metal element and the Net intensity of the alkaline earth metal element is as follows.

About 0.12 g of the toner particles (or the toner including the toner particles and the external additive) is compressed by using a compression molding machine under a pressure of a load of 6 t for 60 seconds to prepare a disk having a diameter of 50 mm and a thickness of 2 mm. Using this disk as a sample, qualitative and quantitative element analysis is performed under the following conditions using a scanning fluorescence X-ray analysis device (ZSX Primus II manufactured by Rigaku Corporation) to obtain the Net intensity (unit: kilo counts per second, kcps) of each of the alkali metal element and the alkaline earth metal element. Then, the Net intensity $N_A$ is calculated by summing the Net intensity of the alkali metal element and the Net intensity of the alkaline earth metal element.

Tube voltage: 40 kV

Tube current: 70 mA

Anticathode: rhodium

Measurement time: 15 minutes

Analysis diameter: 10 mm in diameter

From the viewpoint that the adhesion of the adsorbed moisture is further facilitated, and the two-layer structure of the external additive is more likely to be maintained, the alkali metal element and the alkaline earth metal element may contain at least one selected from the group consisting of Na, Mg, and Ca.

From the viewpoint that the adhesion of the adsorbed moisture is further facilitated, and the two-layer structure of the external additive is more likely to be maintained, the alkali metal element and the alkaline earth metal element may contain at least one selected from the group consisting of Na and Mg.

A Net intensity $N_N$ of Na element measured by the fluorescence X-ray analysis may be 0.01 kcps or more and 0.20 kcps or less, and is preferably 0.02 kcps or more and 0.15 kcps or less, and more preferably 0.03 kcps or more and 0.10 kcps or less.

From the viewpoint of preventing density unevenness and white spots in the obtained image, a Net intensity $N_M$ of Mg element measured by the fluorescence X-ray analysis is more preferably 0.15 kcps or more and 1.10 kcps or less, and still more preferably 0.20 kcps or more and 1.00 kcps or less.

Here, the Net intensity $N_N$ of the Na element, the Net intensity $N_M$ of the Mg element, and a Net intensity $N_C$ of Ca element are measured in the same procedure as the method of measuring the Net intensity of the alkali metal element and the Net intensity of the alkaline earth metal element, except that the Net intensity $N_N$ of the Na element, the Net intensity $N_M$ of the Mg element, and the Net intensity Ne of the Ca element are obtained in the qualitative and quantitative element analysis.

In the toner according to the exemplary embodiment, the Net intensity $N_S$ of the S element in the toner particle measured by the fluorescence X-ray analysis may be 3.0 kcps or more and 6.0 kcps or less, and is preferably 3.5 kcps or more and 5.5 kcps or less, and more preferably 4.0 kcps or more and 5.0 kcps or less.

By controlling the Net intensity $N_S$ of the S element to fall within the above range, the image density unevenness is prevented when an image having a high image density is formed after an image having a low image density is continuously formed under the high-temperature and high-humidity environment. The reasons are presumed as follows.

In order to control the Net intensity $N_S$ of the S element to fall within the above range, the S element supply source may be added.

Since the S element has a function of improving the dispersibility of the alkali metal element and the alkaline earth metal element in the toner particle, the dispersibility of the alkali metal element and the alkaline earth metal element in the toner particle is improved by adding the S element supply source such that the Net intensity $N_S$ of the S element is within the above range. As a result, the alkali metal element and the alkaline earth metal element are more likely to be present on the toner particle surface side, and the adsorbed moisture is more likely to adhere to these elements. Therefore, the external additive is more likely to adhere to the toner surface, and the two-layer structure of the external additive is more likely to be maintained.

From the above, it is presumed that by controlling the Net intensity $N_S$ of the S element to fall within the above range, the image density unevenness is prevented when an image having a high image density is formed after an image having a low image density is continuously formed under the high-temperature and high-humidity environment.

Here, the Net intensity $N_S$ of the S element is measured in the same procedure as the method of measuring the Net intensity of the alkali metal element and the Net intensity of the alkaline earth metal element, except that the Net intensity $N_S$ of the S element is obtained in the qualitative and quantitative element analysis.

A ratio ($N_S/N_A$) of the Net intensity $N_S$ to the Net intensity $N_A$ may be more than 3 and less than 40, is preferably 5 or more and 35 or less, is more preferably 10 or more and 30 or less, and is still more preferably 15 or more and 25 or less.

It is presumed that by controlling the ratio ($N_S/N_A$) to fall within the above range, the dispersibility of the alkali metal element and the alkaline earth metal element is improved in the toner particle, and charge leakage caused by containing the S element is prevented, and therefore, the image density unevenness is further prevented when an image having a high image density is formed after an image having a low image density is continuously formed under the high-temperature and high-humidity environment.

—Characteristics of Toner Particle—

The toner particle may be a toner particle having a single-layer structure, or a toner particle having so-called core-shell structure composed of a core portion (core particle) and a coating layer (shell layer) that covers the core portion.

Here, the toner particle having the core-shell structure may include, for example, a core portion containing a binder resin and, if necessary, other additives such as a colorant and a releasing agent, and a coating layer containing the binder resin.

A volume average particle diameter D50v of the toner particle may be 2 μm or more and 10 μm or less, and is preferably 4 μm or more and 8 μm or less.

Various average particle diameters and various particle size distribution indices of the toner particles are measured by using a Coulter Multisizer II (manufactured by Beckman Coulter, Inc.) and ISOTON-II (manufactured by Beckman Coulter, Inc.) as an electrolytic solution.

In the measurement, 0.5 mg or more and 50 mg or less of a measurement sample is added to 2 ml of a 5 mass % aqueous solution of a surfactant (preferably sodium alkylbenzenesulfonate) as a dispersant. The obtained mixture is added to 100 ml or more and 150 ml or less of the electrolytic solution.

The electrolytic solution in which the sample is suspended is subjected to a dispersion treatment for 1 minute with an ultrasonic disperser, and the Coulter Multisizer II is used to measure a particle size distribution of particles having a particle diameter in a range of 2 μm or more and 60 μm or less by using an aperture having an aperture diameter of 100 μm. The number of the particles sampled is 50,000.

A cumulative distribution of the volume and a cumulative distribution of the number are respectively drawn from a small diameter side with respect to the particle size range (channel) divided based on the measured particle size distribution, and particle diameters at which a cumulative percentage is 16% are respectively defined as a volume particle diameter D16v and a number particle diameter D16p, particle diameters at which the cumulative percentage is 50% are defined as a volume average particle diameter D50v and a cumulative number average particle diameter D50p, and particle diameters at which the cumulative percentage is 84% are defined as a volume particle diameter D84v and a number particle diameter D84p.

Using these, the volume particle size distribution index (GSDv) is calculated as $(D84v/D16v)^{1/2}$, and the number particle size distribution index (GSDp) is calculated as $(D84p/D16p)^{1/2}$.

An average circularity of the toner particles may be 0.94 or more and 1.00 or less, and is preferably 0.95 or more and 0.98 or less.

The average circularity of the toner particles is determined from the following calculation: (circle equivalent perimeter)/(perimeter) (i.e. (perimeter of circle having the same projected area as particle image)/(perimeter of projected particle image)). Specifically, the average circularity of the toner particles is a value measured by the following method.

First, the toner particles as measurement targets are sucked and collected to form a flat flow, and flash light is emitted instantly to capture a particle image as a still image. The average circularity is determined by a flow-type particle image analyzer (FPIA-3000 manufactured by Sysmex Corporation) that analyzes the particle image. The number of samples for determining the average circularity is 3,500.

In a case where the toner contains an external additive, the toner (developer) as a measurement target is dispersed in water containing a surfactant, and then an ultrasonic treatment is performed to obtain toner particles from which the external additive is removed.

(External Additive)

The toner according to the exemplary embodiment includes, as the external additive, the alumina particles having a volume average particle diameter of more than 5 nm and 80 nm or less and the silica particles having a volume average particle diameter of 10 nm or more and 90 nm or less.

—Alumina Particle—

The alumina particles are aluminum oxide particles represented by $Al_2O_3$.

A volume average particle diameter of the alumina particles is more than 5 nm and 80 nm or less.

In the case where the volume average particle diameter of the alumina particles is more than 5 nm, occurrence of aggregation between the alumina particles is prevented, and the two-layer structure of the external additive is less likely to collapse.

In the case where the volume average particle diameter of the alumina particles is 80 nm or less, the dispersibility on the surface of the toner particle is improved, and thus the alumina particles easily adhere to the surface of the toner particle in a nearly uniform state. Accordingly, the two-layer structure of the external additive is likely to be formed.

From the viewpoint that the two-layer structure of the external additive is likely to be formed, the volume average particle diameter of the alumina particles may be 10 nm or more and 60 nm or less, and is preferably 15 nm or more and 50 nm or less, and more preferably 18 nm or more to 40 nm or less.

Here, the volume average particle diameter of the alumina particles is measured by the following method.

Using a scanning electron microscope (SEM) (S-4800, manufactured by Hitachi High-Tech Corporation) equipped with an EDX apparatus (EMAX Evolution X-Max 80 $mm^2$, manufactured by Horiba, Ltd.), an image is captured at a magnification of 40,000 times. By the EDX analysis, at least 100 primary particles of the alumina particles are specified based on presence of Al. The image of the specified primary particles of the alumina particles is taken into an image analyzer (LUZEX III, manufactured by Nireco Corporation), an area of each particle is measured by image analysis of the primary particles, and an equivalent circle diameter is calculated based on the area value. The calculation of the equivalent circle diameter is performed for 100 alumina particles. Then, a diameter (D50v) at which a cumulative frequency on a volume basis of the obtained equivalent circle diameter is 50% is defined as the volume average particle diameter of the alumina particles.

The magnification of the electron microscope is adjusted such that about 10 to 50 alumina particles are shown in one field of view, and observation of plural fields of view are performed, and then the equivalent circle diameter of the primary particles is determined.

The average circularity of the alumina particles may be 0.75 or more and 1.0 or less, and is preferably 0.9 or more and 1.0 or less, and more preferably 0.92 or more and 0.98 or less.

In the case where the average circularity of the alumina particles is within the above range, the alumina particles become more spherical, the adhesion to the toner particles is easily controlled, and a two-layer structure of the external additive is more likely to be formed.

Here, the average circularity of the alumina particles is measured by the following method.

First, the circularity of the alumina particle is determined as "100/SF2" calculated by the following equation based on planar image analysis of the primary particles obtained by observing the primary particles of the alumina particles with an SEM device.

$$\text{Circularity}(100/SF2)=4\pi\times(A/I^2) \quad \text{Equation:}$$

In the equation, I represents a perimeter of the primary particle on the image, and A represents a projected area of the primary particle.

The average circularity of the alumina particles is obtained as 50% circularity in a cumulative frequency of the circularity of 100 primary particles obtained by the planar image analysis.

Surfaces of the alumina particles may be subjected to a hydrophobic treatment.

A hydrophobic treatment agent is not particularly limited. Examples of the hydrophobic treatment agent include a silane coupling agent, a silicone oil, a titanate coupling agent, an aluminum coupling agent, and the like. The hydrophobic treatment agent may be used alone or in combination of two or more thereof.

An amount of the hydrophobic treatment agent is generally, for example, based on 100 parts by mass of the alumina particles, preferably 1 part by mass or more and 50 parts by mass or less, more preferably 5 parts by mass or more and 30 parts by mass or less, and still more preferably 8 parts by mass or more and 20 parts by mass or less.

As the hydrophobic treatment agent, at least one of a silane coupling agent and silicone oil may be used.

Examples of the silane coupling agent include a compound represented by the following formula (A) and a compound represented by the following formula (B).

$$(R_1,R_2,R_3)\text{—Si—NH—Si—}(R_1,R_2,R_3) \quad \text{Formula (A)}$$

$$(R_4)_{4-n}\text{—Si—}(OR_5)_n \quad \text{Formula (B)}$$

$R_1$ to $R_5$ are each independently hydrogen atom, an alkyl group, an aryl group, or an alkoxy group. The alkyl group, the aryl group, and the alkoxy group each may have a substituent. $R_1$ to $R_5$ may be the same as or different from each other.

Specifically, the compound represented by the formula (A) is preferably hexamethyldisilazane (in the formula (A), each of $R_1$, $R_2$, and $R_3$ is a methyl group) or hexaethyldisilazane (in the formula (A), each of $R_1$, $R_2$, and $R_3$ is an ethyl group), and is more preferably hexamethyldisilazane.

In the compound represented by the formula (B), specifically, at least one of $R_1$ to $R_5$ in the formula (B) may be a linear alkyl group having 1 to 12 carbon atoms. The linear alkyl group may have a substituent.

In the compound represented by the formula (B), $R_4$ in the formula (B) is preferably a linear alkyl group having 1 to 12 carbon atoms.

In the compound represented by the formula (B), $R_5$ in the formula (B) is preferably a methyl group or an ethyl group.

Examples of the silicone oil include: cyclic compounds such as organosiloxane oligomers, octamethylcyclotetrasiloxane, decamethylcyclopentasiloxane, tetramethylcyclotetrasiloxane, and tetravinyltetramethylcyclotetrasiloxane; linear or branched organosiloxanes; and silicone oils having a modifying group.

Examples of the kind of the modifying group of the silicone oil having a modifying group include alkoxy, carboxy, carbinol, higher fatty acid modification, phenol, epoxy, methacryl, and amino.

The surfaces of the alumina particles may be subjected to a hydrophobic treatment by a common method. Examples of the hydrophobic treatment method include a dry method and a wet method.

The dry method is a method in which the surfaces of the alumina particles are subjected to the hydrophobic treatment by stirring the alumina particles and the hydrophobic treatment agent in a reactor such as a fluidized bed. In the wet method, first, the alumina particles are dispersed in a solvent to form slurry of the alumina particles. Then, the hydrophobic treatment agent is added to the slurry to perform the hydrophobic treatment of the surfaces of the alumina particles.

The hydrophobic treatment may be performed by the dry method. In a case where the surfaces of the alumina particles are subjected to the hydrophobic treatment by the dry method, the alumina particles and the hydrophobic treatment agent may be stirred at 100° C. or more and 200° C. or less for 0.5 hours or more and 5 hours or less.

A volume resistivity of the alumina particle may be $1.0\times10^8$ Ω·cm or more and $1.0\times10^{13}$ Ω·cm or less, and is preferably $1.0\times10^9$ Ω·cm or more and $1.0\times10^{11}$ Ω·cm or less.

The volume resistivity of the alumina particles is measured as follows. The alumina particles are pressure-molded at a surface pressure of 20 t to obtain pellets having a diameter of 20 mm and a thickness of 5.0 mm. An electrical resistance of the pellet as a measurement target is measured under the condition of 20° C. and 50% RH using a digital ultrahigh resistance/minute ammeter R8340A (manufactured by Advantest Corporation).

A content of the alumina particles may be, relative to the toner particles, 0.05 mass % or more and 5.0 mass % or less, and is preferably 0.2 mass % or more and 2.0% mass %, and more preferably 0.4 mass % or more and 1.0 mass % or less.

—Silica Particle—

The external additive includes the silica particles.

A volume average particle diameter of the silica particles is 10 nm or more and 90 nm or less.

In the case where the volume average particle diameter of the silica particles is 10 nm or more, a thickness of a layer made of the silica particles in the two-layer structure of the external additive increases, and the toner is less likely to be excessively charged.

In the case where the volume average particle diameter of the silica particles is 90 nm or less, the silica particles are less likely to be released.

From the viewpoint that the two-layer structure of the external additive is likely to be formed, the volume average particle diameter of the silica particle may be 20 nm or more and 80 nm or less, and is preferably 25 nm or more and 70 nm or less, and more preferably 30 nm or more to 60 nm or less.

Here, the volume average particle diameter of the silica particles is measured by the following method.

Using a scanning electron microscope (SEM) (S-4800, manufactured by Hitachi High-Tech Corporation) equipped with an EDX apparatus (EMAX Evolution X-Max 80 $mm^2$, manufactured by Horiba. Ltd.), an image is captured at a magnification of 40,000 times. By the EDX analysis, at least 100 primary particles of the silica particles are specified based on presence of Si. The image of the specified primary particles of the silica particles is taken into an image analyzer (LUZEX III, manufactured by Nireco Corporation), an area of each particle is measured by image analysis of the primary particles, and an equivalent circle diameter is calculated based on the area value. The calculation of the equivalent circle diameter is performed for 100 silica particles. Then, a diameter (D50v) at which a cumulative frequency on a volume basis of the obtained equivalent circle diameter is 50% is defined as the volume average particle diameter of the silica particles.

The magnification of the electron microscope is adjusted such that about 10 to 50 silica particles are shown in one field of view, and observation of plural fields of view are performed, and then the equivalent circle diameter of the primary particles is determined.

The average circularity of the silica particles may be 0.75 or more and 1.0 or less, and is preferably 0.9 or more and 1.0 or less, and more preferably 0.92 or more and 0.98 or less.

In the case where the average circularity of the silica particles is within the above range, the silica particles become more spherical, the adhesion to the toner particles is easily controlled, and a two-layer structure of the external additive is more likely to be formed.

Here, the average circularity of the silica particles is measured by the following method.

First, the circularity of the silica particle is determined as "100/SF2" calculated by the following equation based on planar image analysis of the primary particles obtained by observing the primary particles of the silica particles with an SEM device.

$$\text{Circularity}(100/SF2)=4\pi\times(A/I^2) \qquad \text{Equation:}$$

[In the equation, I represents a perimeter of the primary particle on the image, and A represents a projected area of the primary particle.]

The average circularity of the silica particles is obtained as 50% circularity in a cumulative frequency of the circularity of 100 primary particles obtained by the planar image analysis.

Surfaces of the silica particles may be subjected to a hydrophobic treatment.

A hydrophobic treatment agent is not particularly limited. Examples of the hydrophobic treatment agent include a silane coupling agent, a silicone oil, a titanate coupling agent, an aluminum coupling agent, and the like. The hydrophobic treatment agent may be used alone or in combination of two or more thereof.

An amount of the hydrophobic treatment agent is generally, for example, 1 part by mass or more and 50 parts by mass or less based on 100 parts by mass of the silica particles.

As the hydrophobic treatment agent, at least one of a silane coupling agent and silicone oil may be used.

Specific examples of the silane coupling agent and the silicone oil include the hydrophobic treatment agents used for the alumina particles described above.

A content of the silica particles may be, relative to the toner particles, 0.5 mass % or more and 5.0 mass % or less, and is preferably 0.8 mass % or more and 4.6 mass % or less, and more preferably 1.0 mass % or more and 4.2 mass % or less.

—Other External Additives—

As the external additive, an external additive other than the alumina particles and the silica particles may be used in combination.

Examples of other external additives include inorganic particles. Examples of the inorganic particles include $TiO_2$, CuO, ZnO, $SnO_2$, $CeO_2$, $Fe_2O_3$, MgO, BaO, CaO, $K_2O$, $Na_2O$, $ZrO_2$, $CaO.SiO_2$, $K_2O.(TiO_2)_n$, $Al_2O_3.2SiO_2$, $CaCO_3$, $MgCO_3$, $BaSO_4$, and $MgSO_4$.

Surfaces of the inorganic particles as other external additives may be subjected to a hydrophobic treatment. The hydrophobic treatment is performed, for example, by immersing the inorganic particles in a hydrophobic treatment agent. The hydrophobic treatment agent is not particularly limited, and examples of the hydrophobic treatment agent include a silane coupling agent, a silicone oil, a titanate coupling agent, an aluminum coupling agent, and the like. The hydrophobic treatment agent may be used alone or in combination of two or more thereof.

An amount of the hydrophobic treatment agent is generally, for example, 1 part by mass or more and 10 parts by mass or less based on 100 parts by mass of the inorganic particles.

Examples of other external additives also include resin particles (resin particles of polystyrene, polymethylmethacrylate (PMMA), melamine resin or the like), and cleaning activators (such as metal salts of higher fatty acids typified by zinc stearate, and fluoropolymer particles).

The amount of other external additives externally added may be, for example, 0.01 mass % or more and 5 mass % or less, and is preferably 0.01 mass % or more and 2.0 mass % or less, relative to the toner particles.

—Content Ratio (Ws/Wa) of External Additive—

In the toner according to the exemplary embodiment, the ratio (Ws/Wa) of the content Ws of the silica particles to the content Wa of the alumina particles is more than 0.5 and less than 35.

From the viewpoint that the two-layer structure of the external additive is likely to be formed, the ratio (Ws/Wa) may be 1.5 or more and 25 or less, and is preferably 2.0 or more and 15 or less, and more preferably 2.5 or more and 5 or less.

—Ratio of Volume Average Particle Diameter of External Additive—

In the toner according to the exemplary embodiment, a ratio of the volume average particle diameter of the silica particles to the volume average particle diameter of the alumina particles may be 0.2 or more and 2.0 or less, and is preferably 0.4 or more and 1.8 or less, and more preferably 0.6 or more and 1.6 or less.

In the case where the ratio of the volume average particle diameter of the silica particles to the volume average particle diameter of the alumina particles is within the above range, a difference in specific gravity between the alumina particles and the silica particles becomes larger, and thus a structure in which the alumina particles are adhered to the surface of the toner particle and the silica particles are further adhered thereto is more easily formed.

(Characteristics of Toner)

—Measurement Results of X-ray Photoelectron Spectroscopy Before and After Ultrasonic Treatment—

In the toner according to the exemplary embodiment, a detection amount of Si relative to a detection amount of Al may be 3.0 or more and 10.5 or less in X-ray photoelectron spectroscopy (XPS) before an ultrasonic treatment, and the detection amount of Si relative to the detection amount of Al may be 2.5 or more and 8.5 or less in the X-ray photoelectron spectroscopy (XPS) after the ultrasonic treatment.

With the above-described configuration, the toner according to the exemplary embodiment further prevents the image density unevenness when an image having a high image density is formed after an image having a low image density is continuously formed under the high-temperature and high-humidity environment. The reasons are presumed as follows.

In the X-ray photoelectron spectroscopy (XPS) before the ultrasonic treatment, by controlling the detection amount of Si relative to the detection amount of Al to 3.0 or more and 10.5 or less, a large amount of silica particles are likely to be contained in the outermost surface of the toner. That is, a layer made of the silica particles is likely to be formed on the outermost surface of the toner.

In the X-ray photoelectron spectroscopy (XPS) after the ultrasonic treatment, by controlling the detection amount of Si relative to the detection amount of Al to 2.5 or more and 8.5 or less, a large amount of alumina particles are likely to be contained inside the layer of the silica particles removed by the ultrasonic treatment and on the surface of the toner particle. That is, a layer made of the alumina particles is likely to be formed inside the layer of silica particles and on the surface of the toner particle. With this configuration, the alumina particles are less likely to be detached from the surface of the toner particle even when the toner is subjected to the ultrasonic treatment or the like. That is, even when an impact or the like is applied to the toner, the alumina particles are likely to be adsorbed to the surface of the toner particle in a stable manner.

As described above, with the above configuration, it is easy to form and maintain a two-layer structure of the external additive, the two-layer structure including the layer made of the alumina particles and the layer made of the silica particles on the layer made of the alumina particles. That is, the toner has a structure containing a large amount of the silica particles on the outermost surface. Since the silica particles have a relatively high electrical resistance, the toner is less likely to be excessively charged even when an image having a low image density is continuously formed under the high-temperature and high-humidity environment.

Therefore, it is presumed that with the above-described configuration, the toner according to the exemplary embodiment further prevents the image density unevenness when an image having a high image density is formed after an image having a low image density is continuously formed under the high-temperature and high-humidity environment.

Here, from the viewpoint that the two-layer structure of the external additive is likely to be formed, in the X-ray photoelectron spectroscopy (XPS) before the ultrasonic treatment, the detection amount of Si relative to the detection amount of Al is more preferably 3.2 or more and 5.0 or less.

From the viewpoint that the two-layer structure of the external additive is likely to be formed, in the X-ray photoelectron spectroscopy (XPS) after the ultrasonic treatment, the detection amount of Si relative to the detection amount of Al is more preferably 2.6 or more and 3.0 or less.

A procedure of the X-ray photoelectron spectroscopy measurement before and after the ultrasonic treatment is as follows.

As a test method, first, the toner is subjected to the ultrasonic treatment in accordance with the following procedure. To an ultrasonic treatment apparatus (Ultrasonic Generator model US-300TCVP (manufactured by Nippon Seiki Co., Ltd.)), 0.1 L of 0.2 mass % surfactant aqueous solution Contaminon N (manufactured by FUJIFILM Wako Pure Chemical Corporation) as an aqueous dispersion medium is put, 5 g of toner particles are added thereto, and ultrasonic vibration with an output of 20 W and a frequency of 20 kHz is applied for 1 minute. Thereafter, the suspended external additive is removed and collected, and the toner particles are taken out and sieved with a mesh to separate the released external additive from the toner particles. Then, the toner particles after the sieving are used as the toner after the ultrasonic treatment.

Thereafter, the X-ray photoelectron spectroscopy measurement is performed on each of the toners before the ultrasonic treatment and the toner after the ultrasonic treatment, and the detection amount of Si and the detection amount of Al in each toner are measured. The detection amount of Si is measured by measuring a Si atomic weight relative to a total atomic weight in a measurement region. The detection amount of Al is measured by measuring an Al atomic weight relative to the total atomic weight in the measurement region.

XPS measurement conditions are as follows.

X-ray photoelectron spectrometer: JPS-9000MX manufactured by JEOL Ltd.

X-ray source: MgKα ray

Acceleration voltage: 10.0 kV

Emission current: 20 mA

Pass energy of photoelectron energy analyzer: 30V

The calculation of each atomic weight in the measurement region is performed using a relative photosensitivity factor provided by JASCO Corporation. and background correction and an area calculation are performed in accordance with analysis application software manufactured by JEOL Ltd.

—Other Characteristics of Toner—

In the toner according to the exemplary embodiment, a maximum endothermic peak temperature in first heating, measured by a differential scanning calorimeter (DSC), may be 58° C. or more and 75° C. or less. In the case where the maximum endothermic peak temperature of the toner is 58° C. or more and 75° C. or less, the fixability of the toner at a low temperature is improved.

The maximum endothermic peak temperature of the toner in the first heating, measured by the differential scanning calorimeter (DSC), is measured as follows.

A differential scanning calorimeter DSC-7 manufactured by PerkinElmer Inc. is used, melting points of indium and zinc are used for temperature correction of a detection unit of the calorimeter, and heat of fusion of indium is used for correction of a heat quantity. An aluminum pan is used for a sample, an empty pan is set for comparison, and a temperature is increased from a room temperature to 150° C. at a temperature rising rate of 10° C./min. Then, in an obtained endothermic curve, a temperature giving the maximum endothermic peak is determined.

(Method for Producing Toner Particles)

The toner according to the exemplary embodiment is obtained by preparing toner particles and then externally adding an external additive to the toner particles.

The toner particles may be produced by either a dry production method (such as a kneading and pulverization method) or a wet production method (such as an aggregation and coalescence method, a suspension and polymerization method, and a dissolution and suspension method). These production methods are not particularly limited, and common production methods are adopted. Among these, the toner particles may be obtained by the aggregation and coalescence method.

Specifically, for example, in the case of producing the toner particles by the aggregation and coalescence method, the toner particles are produced through a step of preparing a resin particle dispersion liquid in which resin particles to be a binder resin are dispersed (resin particle dispersion liquid preparation step), a step of aggregating the resin particles (and other particles if necessary) in the resin particle dispersion liquid (in a dispersion liquid after mixing with another particle dispersion liquid if necessary) to form aggregated particles (aggregated particle forming step), and a step of heating an aggregated particle dispersion liquid in which the aggregated particles are dispersed, to fusing and coalescing the aggregated particles to form the toner particles (fusion and coalescence step).

Here, in order to control the Net intensity of each element in the toner particle to fall within the above range, the supply source of the respective element is added during the production process of the toner particle.

Hereinafter, details of each step will be described.

In the following description, a method for obtaining toner particles containing a colorant and a releasing agent will be described, but the colorant and the releasing agent are used as necessary. Of course, other additives other than the colorant and the releasing agent may be used.

—Resin Particle Dispersion Liquid Preparation Step—

First, a colorant particle dispersion liquid in which colorant particles are dispersed and a releasing agent particle dispersion liquid in which releasing agent particles are dispersed are prepared together with a resin particle dispersion liquid in which resin particles to be the binder resin are dispersed.

Here, the resin particle dispersion liquid is prepared, for example, by dispersing the resin particles in a dispersion medium with a surfactant.

Examples of the dispersion medium for use in the resin particle dispersion liquid include an aqueous medium.

Examples of the aqueous medium include water such as distilled water and ion exchange water, and alcohols. The aqueous medium may be used alone or in combination of two or more thereof.

Examples of the surfactant include: anionic surfactants such as a sulfate-based surfactant, sulfonate-based surfactant, phosphate-based surfactant, and soap-based surfactant; cationic surfactants such as amine salt-based surfactant and quaternary ammonium salt-based surfactant; and non-ionic surfactants such as a polyethylene glycol-based surfactant, alkylphenol ethylene oxide adduct-based surfactant, and polyhydric alcohol-based non-ionic surfactant. Among these, the anionic surfactants and the cationic surfactants are particularly exemplified. The non-ionic surfactant may be used in combination with the anionic surfactant or the cationic surfactant.

The surfactant may be used alone or in combination of two or more thereof.

As for the resin particle dispersion liquid, examples of a method for dispersing the resin particles in the dispersion medium include general dispersion methods such as a rotary shear homogenizer, a ball mill having a medium, a sand mill, and a dyno mill, and the like. Depending on a kind of the resin particles, the resin particles may be dispersed in the dispersion medium by using a phase inversion emulsification method.

In the phase inversion emulsification method, a resin to be dispersed is dissolved in a hydrophobic organic solvent in which the resin is soluble, and a base is added to an organic continuous phase (O phase) for neutralization, and then an aqueous medium (W phase) is added to convert the resin from W/O to O/W (so-called phase inversion) to form a discontinuous phase, and the resin is dispersed in the form of particles in the aqueous medium.

A volume average particle diameter of the resin particles dispersed in the resin particle dispersion liquid may be, for example, 0.01 μm or more and 1 μm or less, and is preferably 0.08 μm or more and 0.8 μm or less, and more preferably 0.1 μm or more and 0.6 μm or less.

The volume average particle diameter D50v of the resin particles is calculated by the volume-based particle size distribution obtained by measurement with a laser diffraction type particle size distribution measuring device (for example, LA-700 manufactured by HORIBA, Ltd.). A divided particle size range is set and the volume-based particle size distribution is obtained. Then, a cumulative distribution is drawn from a small particle diameter size and a particle diameter corresponding to the cumulative percentage of 50% relative to all the particles is the volume average particle diameter D50v. The volume average particle diameter of the particles in another dispersion liquid is measured in the same manner.

A content of the resin particles contained in the resin particle dispersion liquid may be 5 mass % or more and 50 mass % or less, and is preferably 10 mass % or more and 40 mass % or less.

Similar to the resin particle dispersion liquid, for example, the colorant particle dispersion liquid and the releasing agent particle dispersion liquid are prepared. That is, the volume average particle diameter of particles, the dispersion medium, the dispersion method, and the content of the particles in the resin particle dispersion liquid are the same for the colorant particles dispersed in the colorant particle dispersion liquid and the releasing agent particles dispersed in the releasing agent particle dispersion liquid.

—Aggregated Particle Forming Step—

Next, the resin particle dispersion liquid, the colorant particle dispersion liquid, and the releasing agent particle dispersion liquid are mixed.

Then, in the mixed dispersion liquid, the resin particles, the colorant particles, and the releasing agent particles are hetero-aggregated to form aggregated particles containing the resin particles, the colorant particles, and the releasing agent particles, each having a diameter close to the diameter of the target toner particles.

Specifically, for example, an aggregating agent is added to the mixed dispersion liquid, a pH of the mixed dispersion liquid is adjusted to acidic (for example, a pH of 2 or more and 5 or less), and a dispersion stabilizer is added if necessary. Then, the resin particles are heated to a temperature of a glass transition temperature (specifically, for example, the temperature being equal to or higher than "the glass transition temperature of resin particles minus 30° C." and the temperature being equal to or lower than "the glass transition temperature minus 10° C."), to aggregate the particles dispersed in the mixed dispersion liquid, and thus the aggregated particles are formed.

In the aggregated particle forming step, for example, the aggregating agent may be added at room temperature (for example, 25° C.) while stirring the mixed dispersion liquid with a rotary shear homogenizer, the pH of the mixed dispersion may be adjusted to be acidic (for example, a pH of 2 or more and 5 or less), the dispersion stabilizer may be added as necessary, and then heating may be performed.

Examples of the aggregating agent include a surfactant having a polarity opposite to that of the surfactant used as a dispersant added to the mixed dispersion liquid, an inorganic metal salt, and a divalent or higher metal complex. In particular, in a case where the metal complex is used as the aggregating agent, an amount of the surfactant used is reduced and chargeability is improved.

If necessary, an additive that forms a complex or a similar bond with the metal ion of the aggregating agent may be used. A chelating agent may be used as the additive.

Examples of the inorganic metal salt include: metal salts such as calcium chloride, calcium nitrate, barium chloride, magnesium chloride, zinc chloride, aluminum chloride, and aluminum sulfate; and inorganic metal salt polymers such as polyaluminum chloride, polyaluminum hydroxide, and calcium polysulfide.

A water-soluble chelating agent may be used as the chelating agent. Examples of the chelating agent include oxycarboxylic acids such as tartaric acid, citric acid and gluconic acid, iminodiacetic acid (IDA), nitrilotriacetic acid (NTA), and ethylenediaminetetraacetic acid (EDTA).

An addition amount of the chelating agent may be 0.01 part by mass or more and 5.0 parts by mass or less, and is preferably 0.1 part by mass or more and less than 3.0 parts by mass, relative to 100 parts by mass of the resin particles.

—Fusion and Coalescence Step—

Next, the aggregated particle dispersion liquid in which the aggregated particles are dispersed is heated to, for example, a temperature equal to or higher than the glass transition temperature of the resin particles (for example, a temperature being higher than the glass transition temperature of the resin particles by 10° C. to 30° C.) to fuse and coalesce the aggregated particles to form the toner particles.

The toner particles are obtained through the above steps.

The toner particles may also be produced through a step of obtaining an aggregated particle dispersion liquid in which aggregated particles are dispersed, then further mixing the aggregated particle dispersion liquid and the resin particle dispersion liquid in which the resin particles are dispersed, and performing aggregation so as to further adhere the resin particles to the surface of the aggregated particles to form second aggregated particles, and a step of heating a second aggregated particle dispersion liquid in which the second aggregated particles are dispersed to fuse and coalesce the second aggregated particles, thereby forming the toner particles having a core-shell structure.

Here, after the fusion and coalescence step is completed, the toner particles formed in the solution are subjected to a common washing step, solid-liquid separation step, and drying step to obtain dried toner particles.

In the washing step, from the viewpoint of chargeability, replacement washing with ion exchange water may be sufficiently performed. The solid-liquid separation step is not particularly limited, and suction filtration, pressure filtration or the like may be performed from the viewpoint of productivity. The drying step is not particularly limited, and freeze-drying, air-flow drying, fluid-drying, vibration-type fluid-drying or the like may be performed from the viewpoint of productivity.

Then, the toner according to the exemplary embodiment is produced, for example, by adding an external additive to the obtained dried toner particles and mixing them. The mixing may be performed by, for example, a V-blender, a Henschel mixer, a Loedige mixer, or the like. Further, if necessary, coarse particles in the toner may be removed by using a vibration sieving machine, a wind power sieving machine or the like.

<Electrostatic Charge Image Developer>

The electrostatic charge image developer according to the exemplary embodiment includes at least the toner according to the exemplary embodiment.

The electrostatic charge image developer according to the exemplary embodiment may be a one-component developer containing only the toner according to the exemplary embodiment, or may be a two-component developer in which the toner and a carrier are mixed.

The carrier is not particularly limited, and examples thereof include common carriers. Examples of the carrier include a coated carrier in which a surface of a core made of a magnetic powder is coated with a coating resin; a magnetic powder dispersion-type carrier in which a magnetic powder is dispersed and blended in a matrix resin; and a resin impregnation-type carrier in which a porous magnetic powder is impregnated with a resin.

The magnetic powder dispersion-type carrier and the resin impregnation-type carrier may be carriers in which constituent particles of the carrier are core materials, and the core material is coated with a coating resin.

Examples of the magnetic powder include magnetic metals such as iron, nickel, and cobalt, and magnetic oxides such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond or a modified product thereof, a fluororesin, polyester, polycarbonate, a phenol resin, an epoxy resin, and the like.

The coating resin and the matrix resin may contain other additives such as conductive particles.

Examples of the conductive particles include particles of metals such as gold, silver, or copper, and particles of carbon black, titanium oxide, zinc oxide, tin oxide, barium sulfate, aluminum borate, and potassium titanate.

Here, in order to coat surfaces of the core materials with the coating resin, a method of coating with a coating layer forming solution in which a coating resin and, if necessary, various additives are dissolved in an appropriate solvent is exemplified. The solvent is not particularly limited, and may be selected in consideration of the coating resin to be used, coating suitability, and the like.

Specific examples of the resin coating method include an immersion method in which the core material is immersed in the coating layer forming solution, a spray method in which the coating layer forming solution is sprayed onto the surfaces of the core materials, a fluidized bed method in which the coating layer forming solution is sprayed in a state in which the core material is floated by fluidized air, and a kneader coater method in which the core material of the carrier and the coating layer forming solution are mixed in a kneader coater and the solvent is removed.

A mixing ratio (mass ratio) of the toner to the carrier in the two-component developer may be toner: carrier=1:100 to 30:100, and preferably 3:100 to 20:100.

<Image Forming Apparatus and Image Forming Method>

An image forming apparatus and an image forming method according to the exemplary embodiment will be described.

The image forming apparatus according to the exemplary embodiment includes: an image carrier; a charging unit that charges a surface of the image carrier, an electrostatic charge image forming unit that forms an electrostatic charge image on the surface of the charged image carrier; a developing unit that accommodates an electrostatic charge image developer and develops, by the electrostatic charge image developer, the electrostatic charge image formed on the surface of the image carrier as a toner image; a transfer unit that transfers the toner image formed on the surface of the image carrier to a surface of a recording medium; and a fixing unit that fixes the toner image transferred on the surface of the recording medium. Then, the electrostatic charge image developer according to the exemplary embodiment is used as the electrostatic charge image developer.

In the image forming apparatus according to the exemplary embodiment, an image forming method (an image forming method according to the exemplary embodiment) is performed, the image forming method including: a charging step of charging the surface of the image carrier; an electrostatic charge image forming step of forming the electrostatic charge image on the charged surface of the image carrier; a developing step of developing, by the electrostatic charge image developer, the electrostatic charge image formed on the surface of the image carrier as a toner image; a transfer step of transferring the toner image formed on the surface of the image carrier to the surface of the recording medium; and a fixing step of fixing the toner image transferred to the surface of the recording medium.

As the image forming apparatus according to the exemplary embodiment, a common image forming apparatus such as a direct transfer type apparatus that directly transfers the toner image formed on the surface of the image carrier to the recording medium, an intermediate transfer type apparatus that primarily transfers the toner image formed on the surface of the image carrier to a surface of an intermediate transfer body, and secondarily transfers the toner image transferred to the surface of the intermediate transfer body to the surface of the recording medium, an apparatus including a cleaning unit that cleans the surface of the image carrier after the transfer of the toner image and before charging, and an apparatus including an erasing unit that erases the surface of the image carrier by irradiation with erasing light after the transfer of the toner image and before the charging, may be used.

In the case of an intermediate transfer type apparatus, the transfer unit includes, for example, an intermediate transfer body having a surface on which a toner image is transferred, a primary transfer unit that primarily transfers the toner image formed on the surface of the image carrier to the surface of the intermediate transfer body, and a secondary transfer unit that secondarily transfers the toner image transferred to the surface of the intermediate transfer body to the surface of the recording medium.

In the image forming apparatus according to the exemplary embodiment, for example, a part including the developing unit may have a cartridge structure (process cartridge) detachable from the image forming apparatus. As the process cartridge, for example, a process cartridge including a developing unit that accommodates the electrostatic charge image developer according to the exemplary embodiment may be used.

Hereinafter, an example of the image forming apparatus according to the exemplary embodiment will be described, but the image forming apparatus is not limited thereto. The parts illustrated in the drawings will be described, and description of the other parts will be omitted.

FIG. 1 is a schematic configuration diagram illustrating the image forming apparatus according to the exemplary embodiment.

The image forming apparatus illustrated in FIG. 1 includes first to fourth electrophotographic image forming units 10Y, 10M, 10C, and 10K (image forming units) that output images of respective colors of yellow (Y), magenta (M), cyan (C), and black (K) based on image data subjected to color separation. These image forming units (hereinafter, may also be simply referred to as "unit") 10Y, 10M, 10C, and 10K are arranged side by side at a preset distance from each other in a horizontal direction. These units 10Y, 10M, 10C, and 10K may be process cartridges that are detachable from the image forming apparatus.

Above the units 10Y, 10M, 10C, and 10K in the drawing, an intermediate transfer belt 20 (an example of the intermediate transfer body) as the intermediate transfer body extends through respective units. The intermediate transfer belt 20 is provided by being wound around a drive roll 22 and a support roll 24 in contact with an inner surface of the intermediate transfer belt 20, which are disposed to be separated from each other from the left to the right in the drawing, and travels in a direction from the first unit 10Y to the fourth unit 10K. A force is applied to the support roll 24 in a direction away from the drive roll 22 by a spring or the like (not illustrated), and tension is applied to the intermediate transfer belt 20 wound around the support roll 24 and the drive roll 22. An intermediate transfer body cleaning device 30 is provided on a side surface of an image carrier of the intermediate transfer belt 20 so as to face the drive roll 22.

Yellow, magenta, cyan, and black toners stored in toner cartridges 8Y, 8M, 8C, and 8K are supplied to developing devices 4Y, 4M, 4C, and 4K (developing unit) of the units 10Y, 10M, 10C, and 10K, respectively.

Since the first to fourth units 10Y, 10M, 10C, and 10K have the same configuration, here, the first unit 10Y that is arranged on an upstream side in a traveling direction of the intermediate transfer belt and forms a yellow image, will be described as a representative. 1M, 1C, and 1K in the second to fourth units 10M, 10C, and 10K are photoconductors corresponding to the photoconductor 1Y in the first unit 10Y; 2M, 2C and 2K are charging rolls corresponding to the charging roll 2Y; 3M, 3C, and 3K are laser beams corresponding to the laser beam 3Y; and 6M, 6C, and 6K are photoconductor cleaning devices corresponding to the photoconductor cleaning device 6Y. Portions equivalent to those of the first unit 10Y are denoted by adding reference numerals with magenta (M), cyan (C), and black (K) instead of yellow (Y), and descriptions of the second to fourth units 10M, 10C, and 10K are omitted.

The first unit 10Y includes the photoconductor 1Y (an example of the image carrier) that act as an image carrier. Around the photoconductor 1Y, the following members are arranged in the following order: the charging roll 2Y (an example of the charging unit) that charges a surface of the photoconductor 1Y to a preset potential; an exposure device 3 (an example of the electrostatic charge image forming unit) that exposes the charged surface with the laser beam 3Y based on a color-separated image signal to form an electrostatic charge image; the developing device 4Y (an example of the developing unit) that supplies a charged toner to the electrostatic charge image to develop the electrostatic charge image: a primary transfer roll 5Y (an example of the primary transfer unit) that transfers the developed toner image onto the intermediate transfer belt 20; and the photoconductor cleaning device 6Y (an example of the cleaning unit) that removes the toner remaining on the surface of the photoconductor 1Y after the primary transfer.

The primary transfer roll 5Y is arranged on an inner side of the intermediate transfer belt 20 and is provided at a position facing the photoconductor 1Y. A bias power supply (not illustrated) that applies a primary transfer bias is connected to each of the primary transfer rolls 5Y, 5M, 5C, and 5K. Each bias power supply changes a value of the transfer bias applied to each primary transfer roll under the control of a controller (not illustrated).

Hereinafter, an operation of forming a yellow image in the first unit 10Y will be described.

First, prior to the operation, the surface of the photoconductor 1Y is charged to a potential of −600 V to −800 V by using the charging roll 2Y.

The photoconductor 1Y is formed by laminating a photoconductive layer on a conductive substrate (for example, having a volume resistivity at 20° C. being $1\times10^{-6}$ Ω·cm or less). The photoconductive layer usually has high resistance (resistance of general resin), but, has characteristics that when irradiated with a laser beam 3Y, the specific resistance of the portion irradiated with the laser beam changes. Therefore, the laser beam 3Y is output to the charged surface of the photoconductor 1Y via the exposure device 3 in accordance with yellow image data sent from the controller (not illustrated). The photosensitive layer on the surface of the photoconductor 1Y is irradiated with the laser beam 3Y, and accordingly, an electrostatic charge image having a yellow image pattern is formed on the surface of the photoconductor 1Y.

The electrostatic charge image is an image formed on the surface of the photoconductor 1Y by charging, and is a so-called negative latent image formed by lowering the specific resistance of the portion of the photoconductive layer irradiated with the laser beam 3Y to allow charges on the surface of the photoconductor 1Y to flow and by, on the other hand, leaving charges of a portion not irradiated with the laser beam 3Y.

The electrostatic charge image formed on the photoconductor 1Y rotates to a preset developing position by travelling of the photoconductor 1Y. Then, at this developing position, the electrostatic charge image on the photoconductor 1Y is visualized (developed) as a toner image by the developing device 4Y.

In the developing device 4Y, for example, an electrostatic charge image developer containing at least a yellow toner and a carrier is accommodated. The yellow toner is triboelectrically charged by being stirred inside the developing device 4Y, and has charges of the same polarity (negative polarity) as the charges on the photoconductor 1Y and is carried on a developer roll (an example of a developer carrier). Then, when the surface of the photoconductor 1Y passes through the developing device 4Y, the yellow toner electrostatically adheres to an erased latent image portion on the surface of the photoconductor 1Y, and the latent image is developed by the yellow toner. The photoconductor 1Y on which the yellow toner image is formed continuously travels at a preset speed, and the toner image developed on the photoconductor 1Y is conveyed to a preset primary transfer position.

When the yellow toner image on the photoconductor 1Y is conveyed to the primary transfer position, a primary transfer bias is applied to the primary transfer roll 5Y, an electrostatic force from the photoconductor 1Y to the primary transfer roll 5Y acts on the toner image, and the toner image on the photoconductor 1Y is transferred to the intermediate transfer belt 20. The transfer bias applied at this time has a polarity (+) opposite to the polarity (−) of the toner, and is controlled to +10 μA by the controller (not illustrated), for example, in the first unit 10Y.

On the other hand, the toner remaining on the photoconductor 1Y is removed and collected by the photoconductor cleaning device 6Y.

The primary transfer bias applied to each of the primary transfer rolls 5M, 5C, and 5K of the second unit 10M and the subsequent units is also controlled in the same manner as in the first unit.

In this way, the intermediate transfer belt 20 to which the yellow toner image is transferred by the first unit 10Y is sequentially conveyed through the second to fourth units 10M, 10C, and 10K, and the toner images of the respective colors are superimposed and transferred in a multiple manner.

The intermediate transfer belt 20 onto which the toner images of four colors are transferred in a multiple manner through the first to fourth units arrives at a secondary transfer unit including the intermediate transfer belt 20, the support roll 24 in contact with the inner surface of the intermediate transfer belt, and a secondary transfer roll 26 (an example of the secondary transfer unit) arranged on the image carrying surface side of the intermediate transfer belt 20. On the other hand, a recording sheet P (an example of the recording medium) is fed through a supply mechanism to a gap where the secondary transfer roll 26 and the intermediate transfer belt 20 are in contact with each other at a preset timing, and a secondary transfer bias is applied to the support roll 24. The transfer bias applied at this time has the same polarity (−) as the polarity (−) of the toner. The electrostatic force from the intermediate transfer belt 20 to the recording sheet P acts on the toner image, and the toner image on the intermediate transfer belt 20 is transferred to the recording sheet P. The secondary transfer bias at this time is determined based on the resistance detection by a resistance detection unit (not illustrated) that detects the resistance of the secondary transfer unit, and is controlled by voltage.

Thereafter, the recording sheet P is sent to a pressure-contacting portion (nip portion) of a pair of fixing rolls in a fixing device 28 (an example of the fixing unit), and the toner image is fixed to the recording sheet P, thereby forming a fixed image.

Examples of the recording sheet P onto which the toner image is transferred include plain paper for use in electrophotographic copiers, printers or the like. As the recording medium, in addition to the recording sheet P, an OHP sheet or the like may be used.

In order to further improve smoothness of an image surface after fixing, the surface of the recording sheet P may also be smooth. For example, coating paper obtained by coating the surface of the plain paper with a resin or the like, art paper for printing, or the like may be used.

The recording sheet P, on which the fixing of the color image is completed, is discharged toward a discharge unit, and a series of color image forming operations is completed.

<Process Cartridge and Toner Cartridge>

The process cartridge according to the exemplary embodiment will be described.

The process cartridge according to the exemplary embodiment includes a developing unit that accommodates the electrostatic charge image developer according to the exemplary embodiment and develops, by the electrostatic charge image developer, the electrostatic charge image formed on the surface of the image carrier as the toner image, and is detachable from the image forming apparatus.

The process cartridge according to the exemplary embodiment is not limited to the above configuration, and may be configured to include a developing unit and, if necessary, at least one selected from other units such as an image carrier, a charging unit, an electrostatic charge image forming unit, and a transfer unit.

Hereinafter, an example of the process cartridge according to the exemplary embodiment will be illustrated, but the process cartridge is not limited thereto. The parts illustrated in the drawings will be described, and description of the other parts will be omitted.

Figure 2:
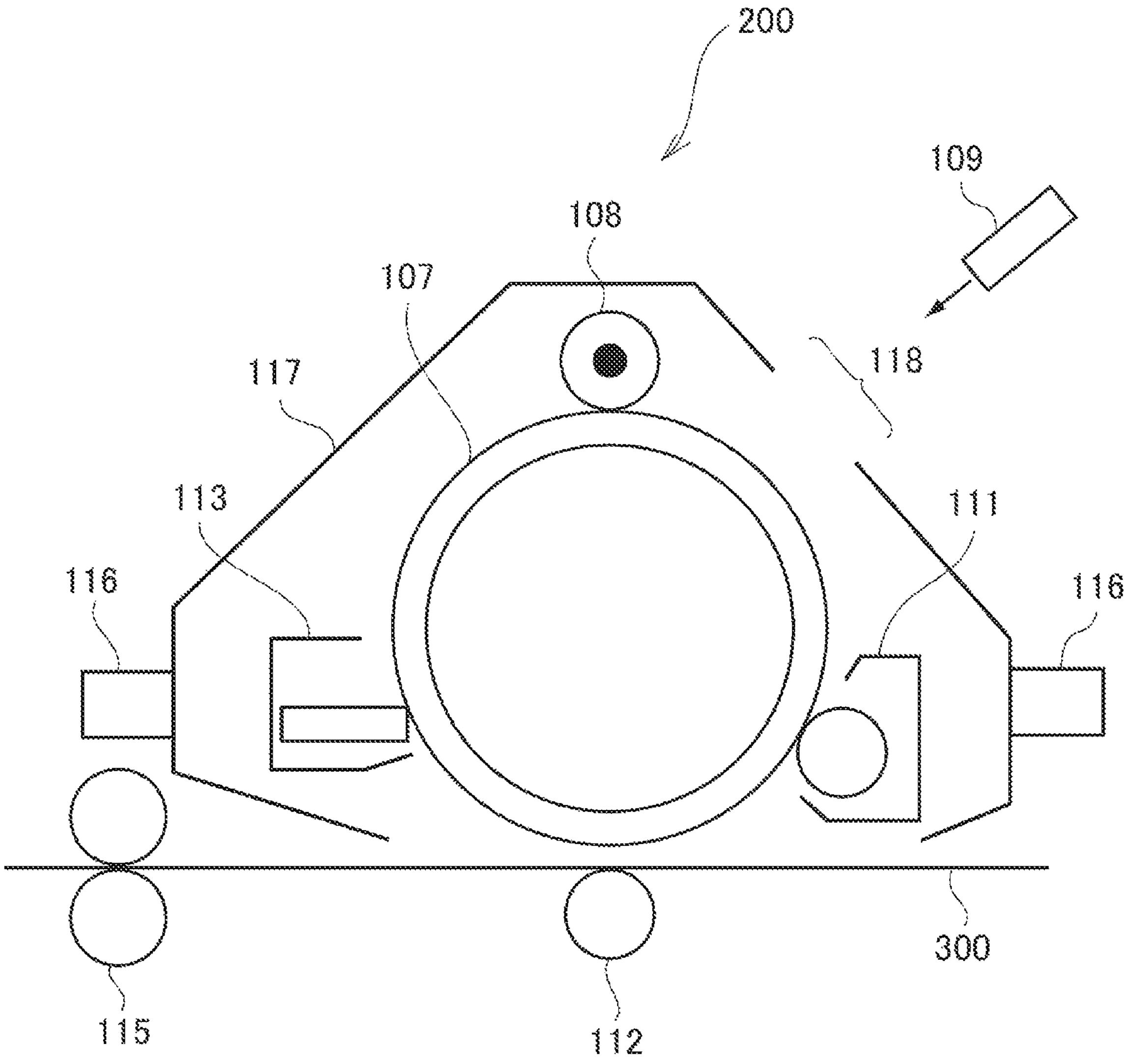
FIG. 2 is a schematic configuration diagram illustrating an example of a process cartridge according to the exemplary embodiment.

FIG. 2 is a schematic configuration diagram illustrating the process cartridge according to the exemplary embodiment.

A process cartridge 200 illustrated in FIG. 2 is configured as a cartridge by, for example, integrally combining and holding a photoconductor 107 (an example of the image carrier), a charging roll 108 (an example of the charging unit), an image developing device Ill (an example of the developing unit), and a photoconductor cleaning device 113 (an example of a cleaning unit), each provided around the photoconductor 107 by a housing 117 having a mounting rail 116 and an opening 118 for exposure.

In FIG. 2, the reference numeral 109 denotes an exposure device (an example of the electrostatic charge image forming unit), the reference numeral 112 denotes a transfer device (an example of the transfer unit), the reference numeral 115 denotes a fixing device (an example of the fixing unit), and the reference numeral 300 denotes recording sheet (an example of the recording medium).

The toner cartridge according to the exemplary embodiment will be described.

The toner cartridge according to the exemplary embodiment accommodates the toner according to the exemplary embodiment and is detachable from the image forming apparatus. The toner cartridge accommodates a toner for replenishment to be supplied to the developing unit provided in the image forming apparatus.

The image forming apparatus illustrated in FIG. 1 is an image forming apparatus having a configuration in which the toner cartridges 8Y, 8M, 8C, and 8K are detachable, and the developing devices 4Y, 4M, 4C, and 4K are connected to toner cartridges corresponding to the respective developing devices (colors) by toner supply pipes (not illustrated). In a case where an amount of the toner accommodated in the toner cartridge decreases, the toner cartridge is replaced.

EXAMPLES

Hereinafter, the exemplary embodiment according to the invention will be described in detail with reference to Examples, but the exemplary embodiment according to the invention is not limited to these Examples. In the following description, the "parts" and "%" are based on mass unless otherwise specified.

<Synthesis of Amorphous Polyester Resin (A)>

Terephthalic acid: 68 parts

Fumaric acid: 32 parts

Ethylene glycol: 42 parts 1,5-pentanediol: 47 parts

The above materials are put into a flask equipped with a stirrer, a nitrogen inlet tube, a temperature sensor, and a rectifying column, the temperature is raised to 220° C. over 1 hour under a nitrogen gas stream, and 1 part of titanium tetraethoxide is added to 100 parts of the total of the above materials. The temperature is raised to 240° C. over 0.5 hours while distilling off produced water, and after a dehydration condensation reaction is continued at 240° C. for 1 hour, a reaction product is cooled. In this way, an amorphous polyester resin (A) having a weight average molecular weight of 97,000 and a glass transition temperature of 60° C. is obtained.

Preparation of Amorphous Polyester Resin Particle Dispersion Liquid (A1)

40 parts of ethyl acetate and 25 parts of 2-butanol are put into a vessel equipped with a temperature control unit and a nitrogen substitution unit to prepare a mixed solvent, then 100 parts of the amorphous polyester resin (A) is gradually added and dissolved, and a 10% ammonia aqueous solution (amount equivalent to three times the acid value of a resin in terms of molar ratio) is added thereto, and then the solution is stirred for 30 minutes. Next, an inside of the vessel is replaced with dry nitrogen, the temperature is maintained at 40° C., and 40 parts of ion exchange water are added dropwise while stirring a mixed solution to perform emulsification. After completion of the dropwise addition, a temperature of an emulsion is returned to 25° C. to obtain a resin particle dispersion liquid in which resin particles having a volume average particle diameter of 195 nm are dispersed. Ion exchange water is added to the resin particle dispersion liquid to adjust a solid content to 20%, thereby obtaining an amorphous polyester resin particle dispersion liquid (A1).

Preparation of Amorphous Polyester Resin Particle Dispersion Liquid (C1) Containing Cyan Colorant 250 parts of the amorphous polyester resin (A) and 50 parts of C.I. Pigment Blue 15:3 (phthalocyanine pigment, Cyanine Blue 4937, manufactured by Dainichiseika Color & Chemicals Mfg. Co., Ltd.) are put into a Henschel mixer and mixed at a screw rotation speed of 600 rpm for 120 seconds to obtain a raw material (A). 200 parts of the raw material (A) and 0.2 parts of a 50% sodium hydroxide aqueous solution are added to a raw material inlet of a twin-screw extruder (TEM-58SS, manufactured by Shibaura Machine Co., Ltd.), 40 parts of an anionic surfactant (Tayca Power, manufactured by Tayca Corporation, solid content: 12%, sodium dodecylbenzenesulfonate) is added from a fourth barrel of the twin-screw extruder, and the mixture is kneaded at each barrel set temperature of 95° C. and a screw rotation speed of 240 rpm. 150 parts of ion exchange water having a temperature of 95° C. is added from a fifth barrel of the twin-screw extruder, 150 parts of the ion exchange water having a temperature of 95° C. is added from a seventh barrel of the twin-screw extruder, 15 parts of the ion exchange water having a temperature of 95° C. is added from a ninth barrel of the twin-screw extruder, and the mixture is kneaded at an average supply amount of the raw material (A) of 200 kg/h to obtain a resin particle dispersion liquid in which resin particles having a volume average particle diameter of 180 nm are dispersed. Ion exchange water is added to the resin particle dispersion liquid to adjust the solid content to 20%, thereby obtaining amorphous polyester resin particle dispersion liquid (C1) containing a cyan colorant (C.I. Pigment Blue 15:3).

Preparation of Amorphous Polyester Resin Particle Dispersion Liquid (M1) Containing Magenta Colorant Amorphous polyester resin particle dispersion liquid (M1) containing a magenta colorant (C.I. Pigment Red 269) is obtained by the method same as that of the amorphous polyester resin particle dispersion liquid (C1) containing a cyan colorant (C.I. Pigment Blue 15:3) except that the colorant is changed from C.I. Pigment Blue 15:3 to C.I. Pigment Red 269 (quinacridone pigment, SYMULER FAST RED 1022, manufactured by DIC Corporation).

Preparation of Amorphous Polyester Resin Particle Dispersion Liquid (Y1) Containing Yellow Colorant Amorphous polyester resin particle dispersion liquid (Y1) containing a yellow colorant (C.I. Pigment Yellow 74) is obtained by the method same as that of the amorphous polyester resin particle dispersion liquid (C1) containing a cyan colorant (C.I. Pigment Blue 15:3) except that the colorant is changed from C.I. Pigment Blue 15:3 to C.I. Pigment Yellow 74 (monoazo pigment, Seikafast Yellow 2054, manufactured by Dainichiseika Color & Chemicals Mfg. Co., Ltd.).

Preparation of Amorphous Polyester Resin Particle Dispersion Liquid (K1) Containing Black Colorant Amorphous polyester resin particle dispersion liquid (K1) containing a black colorant (carbon black) is obtained by the method same as that of the amorphous polyester resin particle dispersion liquid (C1) containing a cyan colorant (C.I. Pigment Blue 15:3) except that the colorant is changed from C.I. Pigment Blue 15:3 to carbon black (Regal 330, manufactured by Cabot Corporation).

Preparation of Amorphous Polyester Resin Particle Dispersion Liquid (C2/M2/Y2/K2) Containing Various Colorants The following amorphous polyester resin particle dispersion liquid containing various colorants are obtained by the method same as that of the amorphous polyester resin particle dispersion liquid (C1) containing a cyan colorant (C.I. Pigment Blue 15:3) except that the number of parts of the anionic surfactant (Tayca Power, manufactured by Tayca Corporation, solid content: 12%, sodium dodecylbenzenesulfonate) added from the fourth barrel of the twin-screw extruder is changed from 40 parts to 60 parts.

Amorphous polyester resin particle dispersion liquid (C2) containing a cyan colorant (C.I. Pigment Blue 15:3)
Amorphous polyester resin particle dispersion liquid (M2) containing a magenta colorant (C.I. Pigment Red 269)
Amorphous polyester resin particle dispersion liquid (Y2) containing a yellow colorant (C.I. Pigment Yellow 74)
Amorphous polyester resin particle dispersion liquid (K2) containing a black colorant (carbon black)

Preparation of Amorphous Polyester Resin Particle Dispersion Liquid (C3/M3/Y3/K3) Containing Various Colorants The following amorphous polyester resin particle dispersion liquid containing various colorants are obtained by the method same as that of the amorphous polyester resin particle dispersion liquid (C1) containing a cyan colorant (C.I. Pigment Blue 15:3) except that the number of parts of the anionic surfactant (Tayca Power, manufactured by Tayca Corporation, solid content: 12%, sodium dodecylbenzenesulfonate) added from the fourth barrel of the twin-screw extruder is changed from 40 parts to 20 parts.

Amorphous polyester resin particle dispersion liquid (C3) containing a cyan colorant (C.I. Pigment Blue 15:3)
Amorphous polyester resin particle dispersion liquid (M3) containing a magenta colorant (C.I. Pigment Red 269)
Amorphous polyester resin particle dispersion liquid (Y3) containing a yellow colorant (C.I. Pigment Yellow 74)
Amorphous polyester resin particle dispersion liquid (K3) containing a black colorant (carbon black)

Preparation of Amorphous Polyester Resin Particle Dispersion Liquid (C4/M4/Y4/K4) Containing Various Colorants The following amorphous polyester resin particle dispersion liquid containing various colorants are obtained by the method same as that of the amorphous polyester resin particle dispersion liquid (C1) containing a cyan colorant (C.I. Pigment Blue 15:3) except that the number of parts of the anionic surfactant (Tayca Power, manufactured by Tayca Corporation, solid content: 12%, sodium dodecylbenzenesulfonate) added from the fourth barrel of the twin-screw extruder is changed from 40 parts to 5 parts.

Amorphous polyester resin particle dispersion liquid (C4) containing a cyan colorant (C.I. Pigment Blue 15:3)
Amorphous polyester resin particle dispersion liquid (M4) containing a magenta colorant (C.I. Pigment Red 269)
Amorphous polyester resin particle dispersion liquid (Y4) containing a yellow colorant (C.I. Pigment Yellow 74)
Amorphous polyester resin particle dispersion liquid (K4) containing a black colorant (carbon black)

Preparation of Crystalline Polyester Resin Particle Dispersion Liquid (B1)

1,10-decanedicarboxylic acid: 260 parts
1,6-hexanediol: 167 parts
Dibutyltin oxide (catalyst): 0.3 parts The above materials are put into a heated and dried three-neck flask, air in the three-neck flask is replaced with nitrogen gas to make an inert atmosphere, and stirring and refluxing are performed at 180° C. for 5 hours by mechanical stirring. Subsequently, the temperature is gradually increased to 230° C. under a reduced pressure, the mixture is stirred for 2 hours, and when the mixture is in a viscous state, air cooling is performed to stop the reaction. In this way, a crystalline polyester resin having a weight average molecular weight of 12,500 and a melting temperature of 73° C. is obtained. 90 parts of the crystalline polyester resin, 1.8 parts of an anionic surfactant (Tayca Power, manufactured by Tayca Corporation, solid content: 12%, sodium dodecylbenzenesulfonate), and 210 parts of ion exchange water are mixed, the mixture is heated to 120° C. and dispersed by using a homogenizer (Ultra Turrax T50, manufactured by IKA-Werke), and then subjected to a dispersion treatment for 1 hour by using a pressure discharge type Gaulin homogenizer to obtain a resin particle dispersion liquid in which resin particles having a volume average particle diameter of 195 nm are dispersed. Ion exchange water is added to the resin particle dispersion liquid to adjust a solid content to 20%, thereby obtaining a crystalline polyester resin particle dispersion liquid (B1).

(Preparation of Crystalline Polyester Resin Particle Dispersion Liquid (B2))

Terephthalic acid: 235 parts
1,4-butenediol: 123 parts
Dibutyltin oxide (catalyst): 0.3 parts The above components are put into a heated and dried three-neck flask, then air in the three-neck flask is brought into an inert atmosphere with nitrogen gas by a decompression operation, and stirring and refluxing are performed at 175° C. for 4 hours by mechanical stirring. Thereafter, the temperature is gradually increased to 230° C. under a reduced pressure, the mixture is stirred for 2 hours, and when the mixture is in a viscous state, air cooling is performed to stop the reaction. As a result of the molecular weight measurement (in terms of polystyrene), a weight average molecular weight (Mw) of the obtained "crystalline polyester resin (B2)" is 12,700, and a melting temperature is 69° C. 90 parts of the obtained resin, 1.5 parts of an anionic surfactant (Tayca Power, manufactured by Tayca Corporation, solid content: 12%, sodium dodecylbenzenesulfonate), and 200 parts of ion exchange water are mixed, the mixture is heated to 120° C., and dispersed by using the Ultra Turrax T50 manufactured by IKA-Werke, and then subjected to a dispersion treatment for 1 hour by using the pressure discharge type Gaulin homogenizer to obtain a crystalline polyester resin particle dispersion liquid (B2) in which a volume average particle diameter of the resin particle is 195 nm and a solid content is 20 parts by mass.

Preparation of Styrene Acrylic Resin Particle Dispersion Liquid (S1)

Styrene: 375 parts
n-butyl acrylate: 25 parts
Acrylic acid: 2 parts
Dodecanthiol: 24 parts
Carbon tetrabromide: 4 parts A mixture obtained by mixing and dissolving the above materials is dispersed and emulsified in a surfactant solution obtained by dissolving 6 parts of a non-ionic surfactant (Nonypol 400, manufactured by Sanyo Chemical Industries, Ltd.) and 10 parts of an anionic surfactant (Tayca Power, manufactured by Tayca Corporation, solid content: 12%, sodium dodecylbenzenesulfonate) in 550 parts of ion exchange water in a flask. Next, an aqueous solution in which 4 parts of ammonium persulfate is dissolved in 50 parts of ion exchange water is added into the flask over 20 minutes while stirring the inside of the flask. Subsequently, after performing nitrogen substitution, the flask is heated in an oil bath until the temperature of the content reaches 70° C. while stirring the inside of the flask, and the temperature is maintained at 70° C. for 5 hours to continue emulsion polymerization. In this way, a resin particle dispersion liquid in which resin particles having a volume average particle diameter of 150 nm are dispersed is obtained. Ion exchange water is added to the resin particle dispersion liquid to adjust a solid content to 20%, thereby obtaining the styrene acrylic resin particle dispersion liquid (S1).

Preparation of Releasing Agent Particle Dispersion Liquid (W1)

Ester wax (WEP-8, melting temperature: 79° C., manufactured by NOF Corporation): 100 parts
Anionic surfactant: 1 part
(Tayca Power, manufactured by Tayca Corporation, sodium dodecylbenzenesulfonate)
Ion exchange water: 350 parts The above materials are mixed, heated to 100° C., and dispersed using a homogenizer (Ultra Turrax T50, manufactured by IKA-Werke), and then a dispersion treatment is performed using a pressure discharge type Gaulin homogenizer to obtain a releasing agent particle dispersion liquid in which releasing agent particles having a volume average particle diameter of 220 nm are dispersed. Ion exchange water is added to the releasing agent particle dispersion liquid to adjust the solid content to 20% to obtain a releasing agent particle dispersion liquid (W1).

Preparation of Toner Particles

Preparation of Toner Particles (C1/M1/Y1/K1) of Various Colors

Ion exchange water: 200 parts
Amorphous polyester resin particle dispersion liquid (C1) containing cyan colorant: 145 parts
Styrene acrylic resin particle dispersion liquid (S1): 30 parts
Releasing agent particle dispersion liquid (W1): 10 parts The above materials are put into a round stainless steel flask, and 0.1N (0.1 mol/L) nitric acid is added thereto to adjust the pH to 3.5, and then an aqueous solution of magnesium chloride prepared by dissolving 6 parts of magnesium chloride in 30 parts of ion exchange water is added. The mixture is dispersed at 30° C. by using the homogenizer (Ultra Turrax T50, manufactured by IKA-Werke), then heated to 45° C. in an oil bath for heating, and held until the volume average particle diameter becomes 4.5 μm.

Next, 30 parts of the amorphous polyester resin particle dispersion liquid (A1) and 15 parts of the crystalline polyester resin particle dispersion liquid (B1) are added and held for 30 minutes. These two dispersion liquids are added every 30 minutes 4 times in total.

Next, 40 parts of the amorphous polyester resin particle dispersion liquid (A1) are added, and the pH is adjusted to 9.0 by using a 1N sodium hydroxide aqueous solution.

Next, while continuing stirring, the temperature is increased to 85° C. at a temperature rising rate of 0.05° C./min, held at 85° C. for 3 hours, and then cooled to 30° C. at a rate of 15° C./min (first cooling). Next, the mixture is heated to 85° C. at a temperature rising rate of 0.2° C./min (reheated), held for 30 minutes, and then cooled to 30° C. at a rate of 0.5° C./min (second cooling).

Next, the solid content is separated by filtration, cleaned with ion exchange water, and dried to obtain cyan toner particles (C1) having a volume average particle diameter of 5.8 μm.

Magenta toner particles (M1), yellow toner particles (Y1), and black toner particles (K1) are obtained by the method same as that of the preparation of the cyan toner particles (C1), except that the amorphous polyester resin particle dispersion liquid (C1) containing a cyan colorant in the preparation of the cyan toner particles (C1) is changed to the amorphous polyester resin particle dispersion liquid (M1) containing a magenta colorant, the amorphous polyester resin particle dispersion liquid (Y1) containing a yellow colorant, and the amorphous polyester resin particle dispersion (K1) containing a black colorant.

Preparation of Toner Particles (C2/M2/Y2/K2) of Various Colors

Toner particles (C2/M2/Y2/K2) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C2/M2/Y2/K2) containing various colorants.

An amount of magnesium chloride added in the preparation of the toner particles is changed from 6 parts to 4 parts.

Preparation of Toner Particles (C3/M3/Y3/K3) of Various Colors

Toner particles (C3/M3/Y3/K3) of various colors are obtained by the method same as that of the preparation of the cyan toner particles (C1), except that in the preparation of the cyan toner particles (C1), the following points are changed.

The amount of magnesium chloride added in the preparation of the toner particles is changed from 6 parts to 20 parts.

Preparation of Toner Particles (C4/M4/Y4/K4) of Various Colors

Toner particles (C4/M4/Y4/K4) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C3/M3/Y3/K3) containing various colorants.

The number of parts of the anionic surfactant (Tayca Power, manufactured by Tayca Corporation, solid content: 12%, sodium dodecylbenzenesulfonate) is changed to 0.5 parts.

Preparation of Toner Particles (C5/M5/Y5/K5) of Various Colors

Toner particles (C5/M5/Y5/K5) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C4/M4/Y4/K4) containing various colorants.

The number of parts of the anionic surfactant (Tayca Power, manufactured by Tayca Corporation, solid content: 12%, sodium dodecylbenzenesulfonate) is changed to 3 parts.

Preparation of Toner Particles (C6/M6/Y6/K6) of Various Colors

Toner particles (C6/M6/Y6/K6) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C2/M2/Y2/K2) containing various colorants.

An amount of magnesium chloride added in the preparation of the toner particles is changed from 6 parts to 2 parts.

Preparation of Toner Particles (C7/M7/Y7/K7) of Various Colors

Toner particles (C7/M7/Y7/K7) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C2/M2/Y2/K2) containing various colorants.

The amount of magnesium chloride added in the preparation of the toner particles is changed from 6 parts to 30 parts.

Preparation of Toner Particles (C8/M8/Y8/K8) of Various Colors

Toner particles (C8/M8/Y8/K8) of various colors are obtained by the method same as that of the preparation of the toner particles (C1/M1/Y1/K1) of various colors except that the crystalline polyester resin particle dispersion liquid (B1) is not added in the preparation of the toner particles (C1/M1/Y1/K1) of various colors.

Preparation of Toner Particles (C9/M9/Y9/K9) of Various Colors

Toner particles (C9/M9/Y9/K9) of various colors are obtained by the method same as that of the preparation of the toner particles (C1/M1/Y1/K1) of various colors except that the crystalline polyester resin particle dispersion liquid (B1) is changed to the crystalline polyester resin particle dispersion liquid (B2) in the preparation of the toner particles (C1/M1/Y1/K1) of various colors.

Preparation of Toner Particles (C10/M10/Y10/K10) of Various Colors

Toner particles (C10/M10/Y10/K10) of various colors are obtained by the method same as that of the preparation of the cyan toner particles (C1), except that in the preparation of the cyan toner particles (C1), the following points are changed.

The number of parts of the anionic surfactant (Tayca Power, manufactured by Tayca Corporation, solid content: 12%, sodium dodecylbenzenesulfonate) is changed to 6 parts.

Preparation of Toner Particles (C11/M11/Y11/K11) of Various Colors

Toner particles (C11/M11/Y11/K11) of various colors are obtained by the method same as that of the preparation of the cyan toner particles (C1), except that in the preparation of the cyan toner particles (C1), the following points are changed.

The number of pans of the anionic surfactant (Tayca Power, manufactured by Tayca Corporation, solid content: 12%, sodium dodecylbenzenesulfonate) is changed to 7 parts.

Preparation of Toner Particles (C12/M12/Y12/K12) of Various Colors

Toner particles (C12/M12/Y12/K12) of various colors are obtained by the method same as that of the preparation of the cyan toner particles (C1), except that in the preparation of the cyan toner particles (C1), the following points are changed.

The number of parts of the anionic surfactant (Tayca Power, manufactured by Tayca Corporation, solid content: 12%, sodium dodecylbenzenesulfonate) is changed to 0.2 parts.

Preparation of Toner Particles (C13/M13/Y13/K13) of Various Colors

Toner particles (C13/M13/Y13/K13) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C2/M2/Y2/K2) containing various colorants.

The amount of magnesium chloride added in the preparation of the toner particles is changed from 6 parts to 23 parts.

Preparation of Toner Particles (C14/M14/Y14/K14) of Various Colors

Toner particles (C14/M14/Y14/K14) of various colors are obtained by the method same as that of the preparation of the cyan toner particles (C1), except that in the preparation of the cyan toner particles (C1), the following points are changed.

The amorphous polyester resin particle dispersion liquid (C1) containing a cyan colorant is changed to amorphous polyester resin particle dispersion liquids (C2/M2/Y2/K2) containing various colorants.

The amount of magnesium chloride added in the preparation of the toner particles is changed from 6 parts to 2.5 parts.

Preparation of Silica Particles

Commercially available silica particles are used as an external additive.

Silica particles (1): RY50, having a volume average particle diameter of 40 nm, manufactured by Nippon Aerosil Co., Ltd.

Silica particles (2): PM20, having a volume average particle diameter of 12 nm, manufactured by Tokuyama Corporation Silica particles (3): TGC243, having a volume average particle diameter of 85 nm, manufactured by Cabot Corporation Silica particles (4): H30TD, having a volume average particle diameter of 7 nm, manufactured by Wacker Chemie AG Silica particles (5): UFP-80HH, having a volume average particle diameter of 100 nm, manufactured by Denka Company Limited Preparation of Alumina Particles (Alumina Particle (1))

Aluminum trichloride ($AlCl_3$) is evaporated in an evaporator at 200° C. The chloride vapor is passed through a mixing chamber of a burner with argon gas at a supply rate of 200 kg/h. Here, argon gas containing the chloride vapor is mixed with 100 $Nm^3$/h of hydrogen and 450 $Nm^3$/h of air, and the mixture is supplied to flame via a central tube (diameter 7 mm). A burner temperature at this time is 230° C., and a discharge rate of the tube is about 30 m/s. 0.05 $Nm^3$/h of hydrogen is supplied as a jacket-type gas via an outer tube. The gas is combusted in the reaction chamber and cooled to about 110° C. in a downstream aggregation zone to aggregate primary particles of alumina. From a gas containing hydrochloric acid that is produced at the same time, the obtained aluminum oxide particles are separated by a filter or a cyclone, and powder having wet air is treated at about 600° C. to remove adhesive chloride, thereby obtaining alumina powder.

The obtained alumina powder is put in a reaction vessel, the powder is stirred with a rotary blade in a nitrogen atmosphere while 20 g of decylsilane diluted with 60 g of hexane is added to 100 g of alumina powder, the mixture is heated and stirred at 200° C. for 120 minutes, then cooled with cooling water, and dried under a reduced pressure to obtain alumina particles (1) having a volume average particle diameter of 8 nm.

(Alumina Particle (2))

Alumina particles (2) having a volume average particle diameter of 20 nm are obtained by the method same as that of the alumina particles (1), except that in the production of the alumina particles (1), the aluminum trichloride vapor is passed at 100 kg/h, and the argon gas is supplied into the mixing chamber of the burner at a supply rate of 100 kg/h.

(Alumina Particle (3))

Alumina particles (3) having a volume average particle diameter of 80 nm are obtained by the method same as that of the alumina particles (1), except that in the production of the alumina particles (1), the aluminum trichloride vapor is passed at 50 kg/h, and the argon gas is supplied into the mixing chamber of the burner at a supply rate of 75 kg/h.

(Alumina Particle (4))

Alumina particles (4) having a volume average particle diameter of 5 nm are obtained by the method same as that of the alumina particles (1), except that in the production of the alumina particles (1), the aluminum trichloride vapor is passed at 300 kg/h, and the argon gas is supplied into the mixing chamber of the burner at a supply rate of 300 kg/h.

(Alumina Particle (5))

Alumina particles (5) having a volume average particle diameter of 100 nm are obtained by the method same as that of the alumina particles (1), except that in the production of the alumina particles (1), the aluminum trichloride vapor is passed at 50 kg/h, and the argon gas is supplied into the mixing chamber of the burner at a supply rate of 20 kg/h.

Preparation of Carrier

After 500 parts of spherical magnetite powder particles (having a volume average particle diameter of 0.55 μm) are stirred in a Henschel mixer, 5 parts of a titanate coupling agent are added thereto, the temperature is raised to 100° C., and the mixture is stirred for 30 minutes. Next, 6.25 parts of phenol, 9.25 parts of 35% formalin, 500 parts of magnetite particles treated with the titanate coupling agent, 6.25 parts of 25% ammonia water, and 425 parts of water are put into a four-neck flask and stirred to react at 85° C. for 120 minutes while stirring. Subsequently, the mixture is cooled to 25° C., 500 parts of water are added thereto, a supernatant liquid is removed, and precipitate is washed with water. The washed precipitate is dried by heating under a reduced pressure to obtain a carrier (CA) having an average particle diameter of 35 μm.

Example 1

(External Addition of External Additive)

After 100 parts of the cyan toner particles (C1) and 0.5 parts of the alumina particles (1) are mixed by using a sample mill at a rotation speed of 10,000 rpm for 30 seconds, the mixture is stood still for 30 seconds, 1.7 parts of the silica particles (1) are further added thereto, and then the mixture is mixed at a rotation speed of 10.000 rpm for 30 seconds. The mixture is sieved with a vibrating sieve having an opening of 45 μm to obtain a toner (C1). A volume average particle diameter of the toner (C1) is 5.8 μm.

(Mixing of Toner and Carrier)

The cyan toner (C1) and the carrier (CA) are put into a V-blender at a ratio of toner (C1): carrier (CA)=5:95 (mass ratio) and stirred for 20 minutes to obtain a cyan developer (C1).

Preparation of Various Developers

A magenta developer (M1) is obtained by the method same as that of the preparation of the cyan developer (C1) except that the magenta toner particles (M1) are used instead of the cyan toner particles (C1).

A yellow developer (Y1) is obtained by the method same as that of the preparation of the cyan developer (C1) except that the yellow toner particles (Y1) are used instead of the cyan toner particles (C1).

A black developer (K1) is obtained by the method same as that of the preparation of the cyan developer (C1) except that the black toner particles (K1) are used instead of the cyan toner particles (C1).

The set of the obtained developers of the various colors is used as a developer set in Example 1.

Examples 2 to 16 and Comparative Examples 1 to 8

A developer set in each example is obtained by the method same as that of Example 1 except that the kind of the used toner particles, the kind of the external additive, and the addition amount are changed as shown in Table 1.

(Measurement of Volume Average Particle Diameter of Toner Particles)

In the developer set in each Example, the volume average particle diameter of the toner particles in the cyan developer is measured according to the method described above. The results are shown in Table 1. The "volume average particle diameter" of the toner particles in the developer of the other colors is substantially the same as the "volume average particle diameter" of the toner particles in the cyan developer.

(Measurement of Net Intensity of Each Element)

In the developer set in each example, the Net intensities of the following elements of the toner particles in the cyan developer are measured according to the method described above. The results are shown in Table 2. The "Net intensity of each element" of the toner particles in the developer of the other colors is substantially the same as the "Net intensity of each element" of the toner particles in the cyan developer.

Net intensity $N_S$ of S element (denoted as "S ($N_S$)" in the table)

Net intensity $N_A$ of the total of alkali metal element and alkaline earth metal element (denoted as "ALKALI ($N_A$)" in the table)

Net intensity $N_N$ of Na element (denoted as "Na ($N_N$)" in the table)

Net intensity $N_M$ of Mg element (denoted as "Mg ($N_M$)" in the table)

Net intensity $N_C$ of Ca element (denoted as "Ca ($N_C$)" in the table)

Total Net intensity $N_{A\text{-}NMC}$ of alkali metal element and alkaline earth metal element other than Na element, Mg element, and Ca element (denoted as "ALKALI−(Na+Mg+Ca) ($N_{A\text{-}NMC}$)" in the table)

<Image Density Unevenness Evaluation>

The developer set in each example is accommodated in a developing device of a modified machine of DocuCentre Color 400 (manufactured by FUJIFILM Business Innovation Corp.). Using this modified machine, 10,000 sheets of four-color band chart images having an image density of 20% are output per day on A4 size J paper (manufactured by FUJIFILM Business Innovation Corp.) under an environment of 28.5° C. and 85% RH. After outputting 20,000 sheets in total, the transfer belt member is taken out, and instead of taking the transfer belt member out, a deteriorated transfer belt member is set in the modified machine of DocuCentre Color 400 (manufactured by FUJIFILM Business Innovation Corp.). The environment is changed to 10° C. and 10% RH, and the mixture is stood for 24 hours or more. Thereafter, a 1×290 mm band chart, a 20×20 mm patch image of secondary colors (red, green, and blue), and a 20×20 mm patch image of tertiary colors (process black) are printed on 7,000 sheets of A4 size 45 paper (basis weight of 52 gsm, manufactured by Ricoh Company, Ltd.) per day. The images on the printed paper are visually checked every 1,000 sheets, and evaluated according to the following evaluation criteria. A to C are set as allowable ranges.

—Evaluation Criteria—

A: There is no problem in image quality.

B: Slight image density unevenness is observed around the patch of the tertiary color, but there is no problem in image quality.

C: Slight image density unevenness is observed around the patch of the secondary color in addition to the tertiary color, but there is no problem in image quality.

D: Image density unevenness is observed in the tertiary color.

E: Image density unevenness is observed around the patch of the secondary color in addition to the tertiary color.

The "particle diameter ratio (Si/Al)" in the table indicates a ratio of the volume average particle diameter of the silica particles to the volume average particle diameter of the alumina particles.

TABLE 1

| | | Toner Particles | | | Alumina Particles | |
|---|---|---|---|---|---|---|
| | Developer Kind | Kind | Particle diameter [μm] | Crystalline resin (polycarboxylic acid species/ polyhydric alcohol species) | Kind | Particle diameter [nm] |
| Example 1 | Developer C1/M1/Y1/K1 | Toner particles C1/M1/Y1/K1 | 5.8 | 1,10-DDA/ 1,6-HDO | 1 | 8 |
| Example 2 | Developer C2/M2/Y2/K2 | Toner particles C1/M1/Y1/K1 | 5.8 | 1,10-DDA/ 1,6-HDO | 2 | 20 |
| Example 3 | Developer C3/M3/Y3/K3 | Toner particles C1/M1/Y1/K1 | 5.8 | 1,10-DDA/ 1,6-HDO | 3 | 80 |
| Example 4 | Developer C4/M4/Y4/KA | Toner particles C1/M1/Y1/K1 | 5.8 | 1,10-DDA/ 1,6-HDO | 2 | 20 |
| Example 5 | Developer C5/M5/Y5/K5 | Toner particles C1/M1/Y1/K1 | 5.8 | 1,10-DDA/ 1,6-HDO | 2 | 20 |
| Example 6 | Developer C6/M6/Y6/K6 | Toner particles C2/M2/Y2/K2 | 5.8 | 1,10-DDA/ 1,6-HDO | 2 | 20 |
| Example 7 | Developer C7/M7/Y7/K7 | Toner particles C3/M3/Y3/K3 | 5.8 | 1,10-DDA/ 1,6-HDO | 2 | 20 |
| Example 8 | Developer C8/M8/Y8/K8 | Toner particles C4/M4/Y4/K4 | 5.8 | 1,10-DDA/ 1,6-HDO | 2 | 20 |
| Example 9 | Developer C9/M9/Y9/K9 | Toner particles C5/M5/Y5/K5 | 5.8 | 1,10-DDA/ 1,6-HDO | 2 | 20 |
| Comparative Example 1 | Developer CC1/MC1/ YC1/KC1 | Toner particles C6/M6/Y6/K6 | 5.8 | 1,10-DDA/ 1,6-HDO | 2 | 20 |
| Comparative Example 2 | Developer CC2/MC2/ YC2/KC2 | Toner particles C7/M7/Y7/K7 | 5.8 | 1,10-DDA/ 1,6-HDO | 2 | 20 |
| Comparative Example 3 | Developer CC3/MC3/ YC3/KC3 | Toner particles C1/M1/Y1/K1 | 5.8 | 1,10-DDA/ 1,6-HDO | 4 | 5 |
| Comparative Example 4 | Developer CC4/MC4/ YC4/KC4 | Toner particles C1/M1/Y1/K1 | 5.8 | 1,10-DDA/ 1,6-HDO | 5 | 100 |
| Comparative Example 5 | Developer CC5/MC5/ YC5/KC5 | Toner panicles C1/M1/Y1/K1 | 5.8 | 1,10-DDA/ 1,6-HDO | 2 | 20 |
| Comparative Example 6 | Developer CC6/MC6/ YC6/KC6 | Toner panicles C1/M1/Y1/K1 | 5.8 | 1,10-DDA/ 1,6-HDO | 2 | 20 |
| Comparative Example 7 | Developer CC7/MC7/ YC7/KC7 | Toner panicles C1/M1/Y1/K1 | 5.8 | 1,10-DDA/ 1,6-HDO | 2 | 20 |
| Comparative Example 8 | Developer CC9/MC9/ YC9/KC9 | Toner particles C1/M1/Y1/K1 | 5.8 | 1,10-DDA/ 1,6-HDO | 1 | 8 |
| Example 10 | Developer C10/M10/ Y10/K10 | Toner particles C13/M13/ Y13/K13 | 5.8 | 1,10-DDA/ 1,6-HDO | 1 | 8 |
| Example 11 | Developer C11/M11/ Y11/K11 | Toner particles C14/M14/ Y14/K14 | 5.8 | 1,10-DDA/ 1,6-HDO | 1 | 8 |
| Example 12 | Developer C12/M12/ Y12/K12 | Toner particles C10/M10/ Y10/K10 | 5.8 | 1,10-DDA/ 1,6-HDO | 1 | 8 |
| Example 13 | Developer C13/M13/ Y13/K13 | Toner particles C11/M11/ Y11/K11 | 5.8 | 1,10-DDA/ 1,6-HDO | 1 | 8 |
| Example 14 | Developer C14/M14/ Y14/K14 | Toner particles C12/M12/ Y12/K12 | 5.8 | 1,10-DDA/ 1,6-HDO | 1 | 8 |
| Example 15 | Developer C15/M15/ Y15/K15 | Toner panicles C8/M8/Y8/K8 | 5.8 | — | 1 | 8 |
| Example 16 | Developer C16/M16/ Y16/K16 | Toner panicles C9/M9/Y9/K9 | 5.8 | Terephthalic acid/ 1.4-butenediol | 2 | 20 |

TABLE 1-continued

| | Alumina Particles | Silica Particles | | | External Additive | |
|---|---|---|---|---|---|---|
| | Addition amount (part) | Kind | Particle diamter [nm] | Addition amount (part) | Ratio (Ws/Wa) | Particle Diameter Ratio (Si/Al) |
| Example 1 | 0.5 | 1 | 40 | 1.7 | 3.4 | 5.0 |
| Example 2 | 0.5 | 1 | 40 | 1.7 | 3.4 | 2.0 |
| Example 3 | 0.5 | 1 | 40 | 1.7 | 3.4 | 0.5 |
| Example 4 | 0.5 | 2 | 12 | 1.7 | 3.4 | 0.6 |
| Example 5 | 0.5 | 3 | 85 | 1.7 | 3.4 | 4.3 |
| Example 6 | 0.2 | 1 | 40 | 2.0 | 10.0 | 2.0 |
| Example 7 | 1.5 | 1 | 40 | 1.0 | 0.7 | 2.0 |
| Example 8 | 0.5 | 1 | 40 | 1.7 | 3.4 | 2.0 |
| Example 9 | 0.5 | 1 | 40 | 1.7 | 3.4 | 2.0 |
| Comparative Example 1 | 0.5 | 1 | 40 | 1.7 | 3.4 | 2.0 |
| Comparative Example 2 | 0.5 | 1 | 40 | 1.7 | 3.4 | 2.0 |
| Comparative Example 3 | 0.5 | 1 | 40 | 1.7 | 3.4 | 8.0 |
| Comparative Example 4 | 0.5 | 1 | 40 | 1.7 | 3.4 | 0.4 |
| Comparative Example 5 | 0.5 | 4 | 7 | 1.7 | 3.4 | 0.4 |
| Comparative Example 6 | 0.5 | 5 | 100 | 1.7 | 3.4 | 5.0 |
| Comparative Example 7 | 1.5 | 1 | 40 | 0.5 | 0.3 | 2.0 |
| Comparative Example 8 | 0.1 | 1 | 40 | 4.0 | 40.0 | 5.0 |
| Example 10 | 0.5 | 1 | 40 | 1.7 | 3.4 | 5.0 |
| Example 11 | 0.5 | 1 | 40 | 1.7 | 3.4 | 5.0 |
| Example 12 | 0.5 | 1 | 40 | 1.7 | 3.4 | 5.0 |
| Example 13 | 0.5 | 1 | 40 | 1.7 | 3.4 | 5.0 |
| Example 14 | 0.5 | 1 | 40 | 1.7 | 3.4 | 5.0 |
| Example 15 | 0.5 | 1 | 40 | 1.7 | 3.4 | 5.0 |
| Example 16 | 0.5 | 1 | 40 | 1.6 | 3.2 | 2.0 |

TABLE 2

| | Net intensity | | | | | | | XPS | | |
|---|---|---|---|---|---|---|---|---|---|---|
| | ALKALI ($N_A$) | Na ($N_N$) | Mg ($N_M$) | Ca ($N_C$) | ALKALI − (Na + Mg + Ca) ($N_{A-NMC}$) | S ($N_S$) | $N_S/N_A$ | Before treatment (Si/Al) | After treatment (Si/Al) | Image density unevenness |
| Example 1 | 0.29 | 0.03 | 0.26 | 0 | 0 | 4.00 | 13.79 | 3.40 | 2.72 | B |
| Exampie 2 | 0.29 | 0.03 | 0.26 | 0 | 0 | 4.00 | 13.79 | 3.40 | 2.72 | A |
| Example 3 | 0.29 | 0.03 | 0.26 | 0 | 0 | 4.00 | 13.79 | 3.40 | 2.72 | B |
| Example 4 | 0.29 | 0.03 | 0.26 | 0 | 0 | 4.00 | 13.79 | 3.40 | 2.72 | B |
| Example 5 | 0.29 | 0.03 | 0.26 | 0 | 0 | 4.00 | 13.79 | 3.40 | 2.72 | B |
| Example 6 | 0.13 | 0.03 | 0.10 | 0 | 0 | 3.00 | 23.08 | 10.00 | 8.00 | C |
| Example 7 | 1.23 | 0.03 | 1.20 | 0 | 0 | 4.00 | 3.252 | 0.67 | 0.53 | C |
| Example 8 | 0.29 | 0.03 | 0.26 | 0 | 0 | 3.00 | 10.34 | 3.40 | 2.72 | B |
| Example 9 | 0.29 | 0.03 | 0.26 | 0 | 0 | 5.00 | 17.24 | 3.40 | 2.72 | B |
| Comparative Example 3 | 0.08 | 0.03 | 0.05 | 0 | 0 | 3.00 | 37.5 | 3.40 | 2.72 | D |
| Comparative Example 2 | 1.43 | 0.03 | 1.40 | 0 | 0 | 3.00 | 2.098 | 3.40 | 2.72 | D |
| Comparative Example 3 | 0.29 | 0.03 | 0.26 | 0 | 0 | 4.00 | 13.79 | 3.40 | 2.72 | D |
| Comparative Example 4 | 0.29 | 0.03 | 0.26 | 0 | 0 | 4.00 | 13.79 | 3.40 | 2.72 | E |
| Comparative Example 5 | 0.29 | 0.03 | 0.26 | 0 | 0 | 4.00 | 13.79 | 3.40 | 2.72 | E |
| Comparative Example 6 | 0.29 | 0.03 | 0.26 | 0 | 0 | 4.00 | 13.79 | 3.40 | 2.72 | D |
| Comparative Example 7 | 0.29 | 0.03 | 0.26 | 0 | 0 | 4.00 | 13.79 | 0.33 | 0.27 | D |
| Comparative Example 8 | 0.29 | 0.03 | 0.26 | 0 | 0 | 4.00 | 13.79 | 40.00 | 32.00 | D |
| Example 10 | 1.28 | 0.03 | 1.25 | 0 | 0 | 4.00 | 3.125 | 3.40 | 2.72 | B |
| Example 11 | 0.10 | 0.03 | 0.07 | 0 | 0 | 4.00 | 40 | 3.40 | 2.72 | B |

TABLE 2-continued

| | | | | | | | | | | |
|---|---|---|---|---|---|---|---|---|---|---|
| Example 12 | 0.29 | 0.03 | 0.26 | 0 | 0 | 6.00 | 20.69 | 3.40 | 2.72 | C |
| Example 13 | 0.29 | 0.03 | 0.26 | 0 | 0 | 7.00 | 24.14 | 3.40 | 2.72 | C |
| Example 14 | 0.29 | 0.03 | 0.26 | 0 | 0 | 2.09 | 6.897 | 3.40 | 2.72 | C |
| Example 15 | 0.29 | 0.03 | 0.26 | 0 | 0 | 4.00 | 13.79 | 3.40 | 2.72 | C |
| Example 16 | 0.29 | 0.03 | 0.26 | 0 | 0 | 4.00 | 13.79 | 3.20 | 2.56 | C |

From the above results, it is found that the toner according to the exemplary embodiment may prevent the image density unevenness when an image having a high image density is formed after an image having a low image density is continuously formed under the high-temperature and high-humidity environment.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An electrostatic charge image developing toner comprising:
- a toner particle containing a binder resin; and
- an external additive containing:
  - alumina particles having a volume average particle diameter of more than 5 nm and 80 nm or less; and
  - silica particles having a volume average particle diameter of 10 nm or more and 90 nm or less,
- wherein in the toner particle,
- a Net intensity $N_A$ of a total of an alkali metal element and an alkaline earth metal element, measured by fluorescence X-ray analysis, is 0.10 kcps or more and 1.30 kcps or less,
- the alkali metal element and the alkaline earth metal element contain at least one selected from the group consisting of Na, Mg, and Ca, and
- a ratio (Ws/Wa) of a content Ws of the silica particles to a content Wa of the alumina particles is more than 0.5 and less than 35.

2. The electrostatic charge image developing toner according to claim 1,
- wherein the Net intensity $N_A$ is 0.20 kcps or more and 1.00 kcps or less.

3. The electrostatic charge image developing toner according to claim 1,
- wherein the alkali metal element and the alkaline earth metal element contain at least one selected from the group consisting of Na and Mg.

4. The electrostatic charge image developing toner according to claim 1,
- wherein in the toner particle, a Net intensity $N_S$ of S element measured by fluorescence X-ray analysis is 3.0 kcps or more and 6.0 kcps or less.

5. The electrostatic charge image developing toner according to claim 4,
- wherein a ratio ($N_S/N_A$) of the Net intensity $N_S$ to the Net intensity $N_A$ is more than 3 and less than 40.

6. The electrostatic charge image developing toner according to claim 1,
- wherein the binder resin contains an amorphous polyester resin and a crystalline polyester resin.

7. The electrostatic charge image developing toner according to claim 6,
- wherein the crystalline polyester resin is a polymer of an α,ω-linear aliphatic dicarboxylic acid and an α,ω-linear aliphatic diol.

8. The electrostatic charge image developing toner according to claim 1,
- wherein a ratio of the volume average particle diameter of the silica particles to the volume average particle diameter of the alumina particles is 0.2 or more and 2.0 or less.

9. The electrostatic charge image developing toner according to claim 1,
- wherein in X-ray photoelectron spectroscopy (XPS) before an ultrasonic treatment, a detection amount of Si relative to a detection amount of Al is 3.0 or more and 10.5 or less, and
- in X-ray photoelectron spectroscopy (XPS) after the ultrasonic treatment, the detection amount of Si relative to the detection amount of Al is 2.5 or more and 8.5 or less.

10. An electrostatic charge image developer comprising the electrostatic charge image developing toner according to claim 1.

11. A toner cartridge that accommodates the electrostatic charge image developing toner according to claim 1 and is detachable from an image forming apparatus.

12. A process cartridge comprising a developing unit that accommodates the electrostatic charge image developer according to claim 10 and develops an electrostatic charge image formed on a surface of an image carrier as a toner image by the electrostatic charge image developer, the process cartridge being detachable from an image forming apparatus.

13. An image forming apparatus, comprising:
- an image carrier;
- a charging unit that charges a surface of the image carrier;
- an electrostatic charge image forming unit that forms an electrostatic charge image on the charged surface of the image carrier;
- a developing unit that accommodates the electrostatic charge image developer according to claim 10 and develops the electrostatic charge image formed on the surface of the image carrier as a toner image by the electrostatic charge image developer;
- a transfer unit that transfers the toner image formed on the surface of the image carrier to a surface of a recording medium; and
- a fixing unit that fixes the toner image transferred to the surface of the recording medium.

14. The electrostatic charge image developing toner according to claim 2,
- wherein the alkali metal element and the alkaline earth metal element contain at least one selected from the group consisting of Na and Mg.

* * * * *